(12) United States Patent
Reed et al.

(10) Patent No.: US 9,246,607 B2
(45) Date of Patent: Jan. 26, 2016

(54) AUTOMATIC PHASE CALIBRATION

(71) Applicant: Spirent Communications, Inc., Sunnyvale, CA (US)

(72) Inventors: John Douglas Reed, Arlington, TX (US); Alfonso Rodriguez-Herrera, Denton, TX (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

(21) Appl. No.: 14/177,165

(22) Filed: Feb. 10, 2014

(65) Prior Publication Data
US 2015/0229417 A1  Aug. 13, 2015

(51) Int. Cl.
*H04B 3/462* (2015.01)
*H04B 17/21* (2015.01)
*H04B 7/04* (2006.01)

(52) U.S. Cl.
CPC .............. *H04B 17/21* (2015.01); *H04B 7/0413* (2013.01)

(58) Field of Classification Search
USPC ............ 375/224, 226–227; 455/67.11, 67.12, 455/115.1, 115.3; 324/650; 703/13
See application file for complete search history.

(56) References Cited

U.S. PATENT DOCUMENTS

| | | | |
|---|---|---|---|
| 8,331,869 B2 * | 12/2012 | Foegelle | 455/67.12 |
| 2006/0148429 A1 * | 7/2006 | Inogai et al. | 455/115.1 |
| 2007/0236230 A1 * | 10/2007 | Tanbakuchi et al. | 324/650 |
| 2008/0114580 A1 * | 5/2008 | Chin et al. | 703/13 |
| 2010/0285753 A1 * | 11/2010 | Foegelle | 455/67.12 |

* cited by examiner

*Primary Examiner* — Khanh C Tran
(74) *Attorney, Agent, or Firm* — Yiding Wu; Haynes Beffel & Wolfeld LLP

(57) ABSTRACT

A method is provided for calibrating a test platform to establish a phase relationship between copies of a signal at a measurement location within the test platform. Phase relationships of the copies of the signal traversing signal paths and ending at the measurement location are manipulated. Vector signal addition from the copies of the signal is analyzed as the phase relationships are manipulated to find a phase offset adjustment that establishes a particular phase relationship between the signal paths.

16 Claims, 20 Drawing Sheets

AUTOMATIC PHASE CALIBRATION

BACKGROUND

1. Field of the Invention

The technology disclosed relates to a test platform for testing radio communications in a MIMO (multiple-input multiple-output) RF (radio frequency) environment, and more particularly to techniques for phase calibration among multiple signal paths in the test platform.

2. Description of Related Art

In a test platform for testing radio communications in a MIMO RF environment, a multi-path radio channel can be emulated in a channel emulator as multiple delayed copies of a signal transmitted from a signal source, and through multiple signal paths within the test equipment. The test platform needs to ensure that the combined copies of the signal represent the desired test condition. A test platform includes multiple pieces of testing equipment. Because of the connections between pieces of testing equipment and electrical characteristics of each piece of equipment, including relative phase relationships between different components within a piece of testing equipment, there can be phase misalignment between signals throughout the signal paths in the test platform.

An opportunity arises to provide a method of calibrating a test platform to establish a phase relationship between signals reaching a measurement location from multiple signal paths.

SUMMARY

A method of calibrating a test platform to establish a phase relationship between copies of a signal at a measurement location within the test platform. Phase relationships of copies of a signal traversing signal paths and ending at the measurement location are manipulated. Vector signal addition is analyzed from the copies of the signal as the phase relationships are manipulated to find a phase offset adjustment that establishes a particular phase relationship between the signal paths.

Signals as used in the present specification can refer to continuous wave (CW) signals, wide-band modulated signals, and narrowband modulated signals. Vector signal addition as used in the present specification refers to the superposition of two or more waveforms resulting in a new waveform pattern such that, depending on the phase relationship between the waveforms, the superposition can be constructive or destructive. The waveforms can include complex wide-band modulated waveforms, sinusoid, and continuous wave (CW) signals. The waveforms can be represented by phase vectors. When the phase relationship between the waveforms is at a phase alignment (e.g. 0°), a peak can occur in the new waveform pattern. When the phase relationship between the waveforms is 180° from the phase alignment, a null can occur in the new waveform pattern. The vector signal addition can result in a new waveform pattern corresponding to a phase relationship between the waveforms within a full period, such as 360°, including the peak and the null.

The method can be repeated using a changed signal source and a changed signal path through one or more unchanged connections within the test platform. The method can be applied to versions of a signal generated by a pair of signal sources and transmitted through the signal paths including different connections. The method can use one or more phase offsets for the signal paths. The phase offsets can be determined to reduce destructive signal addition from the copies of the signal. A switching network with balanced signal paths can be used to direct copies and versions of signals from a pair of signal sources through the different connections within the test platform.

Particular aspects of the technology disclosed are described in the claims, specification and drawings.

DETAILED DESCRIPTION

The following detailed description is made with reference to the figures. Examples are described to illustrate the present technology, not to limit its scope, which is defined by the claims. Those of ordinary skill in the art will recognize a variety of equivalent variations on the description that follows.

Figure 1:
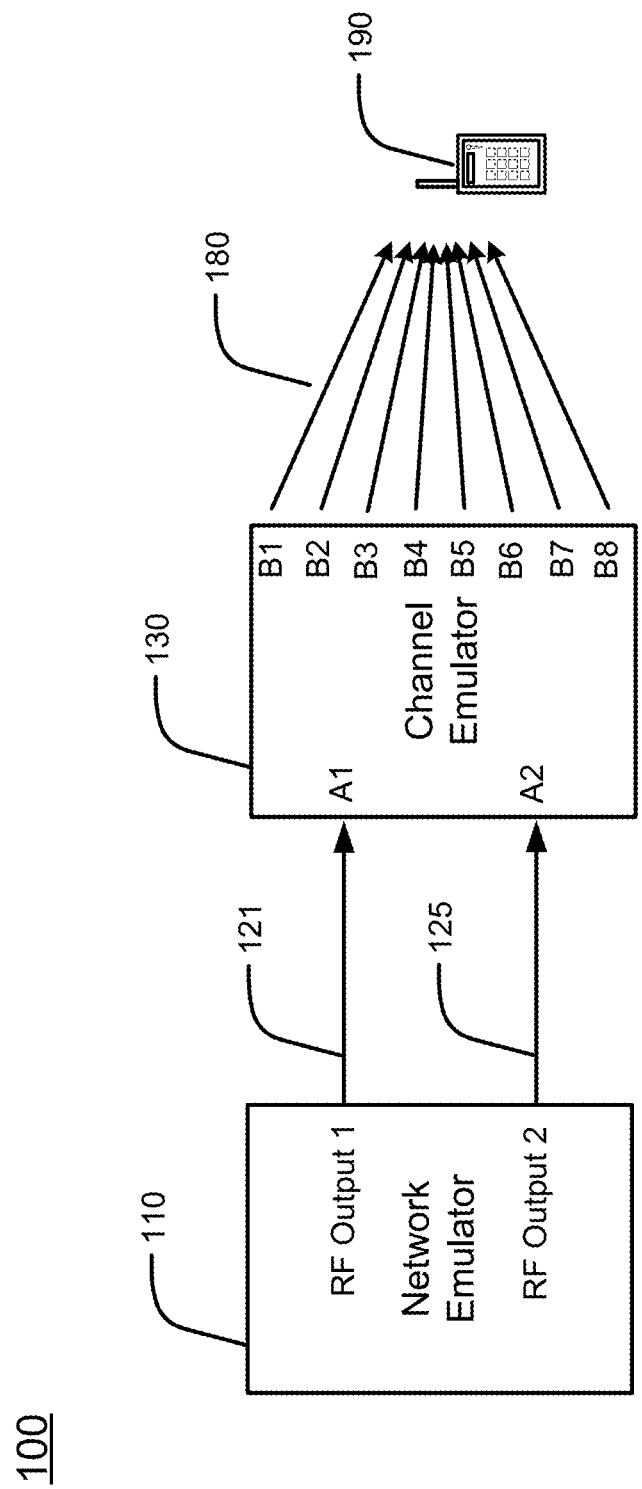
FIG. 1 is a simplified block diagram of an implementation of a test platform to establish a phase relationship between copies of a signal at a measurement location within the test platform.

FIG. 1 is a simplified block diagram of an implementation of a test platform 100 to establish a phase relationship between copies of a signal at a measurement location within the test platform. As illustrated in the example of FIG. 1, a network emulator 110 generates and transmits signals (e.g. 121 and 125) on RF output 1 and RF output 2. For instance, the network emulator 110 can be CMW500, a wideband radio communication tester manufactured by Rohde & Schwarz. The network emulator 110 can be MT8820C, a radio communication analyzer manufactured by Anritsu. The network emulator 110 can also be E2010S, an LTE (long term evolution) broadband wireless test set manufactured by Spirent Communications.

As illustrated in the example of FIG. 1, a channel emulator 130 includes two RF inputs A1 and A2, and eight RF outputs B1-B8. In other implementations, the channel emulator 130 can include more than two RF inputs, and/or more than or less than 8 RF outputs. The RF inputs A1 and A2 receive the signals (e.g. 121 and 125) transmitted by the network emulator 110. Each of the RF outputs of the channel emulator combines power from the RF inputs and transmits the signal with the combined power (e.g. 180). For instance, the channel emulator 130 can be VR5, a channel emulator for testing MIMO devices and base-stations manufactured by Spirent Communications.

A test device (e.g. 190) receives the combined signal with the combined power (e.g. 180). The test device can include any device used by an end-user, a device embedded in a machine, a radio access point, relay node, or a base station. Such devices may also include, but are not limited to a handheld telephone, or a laptop computer equipped with a mobile broadband adapter. The connection between the channel emulator and the test device can be OTA (over-the-air) or cabled.

Signal paths as used in the present application refer to signal paths starting from a signal source inside a network emulator (e.g. 110, FIG. 1) or inside a base station (e.g. 1410, FIG. 14), through signal paths inside the network emulator, through connections between the network emulator and the channel emulator or between the base station and the channel emulator, through signal paths inside the channel emulator, and ending at ends of output cables or antennas connected to outputs of the channel emulator (e.g. 130). Signal paths inside a network emulator are described in connection to FIG. 2 and FIG. 3. Connections between a network emulator and a channel emulator are further described in connection to FIG. 4. Signal paths inside a channel emulator are described in connection to FIG. 4. Connections between a base station and a channel emulator are described in connection to FIGS. 14-16.

Figure 2:
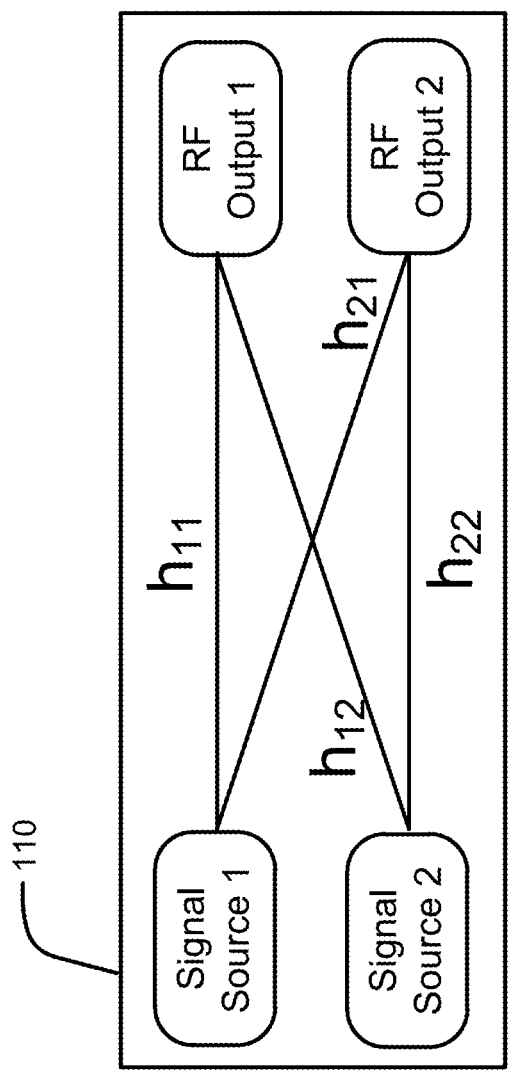
FIG. 2 illustrates an example channel model using a switching network with balanced signal paths in the network emulator.

FIG. 2 illustrates an example channel model using a switching network with balanced signal paths in the network emulator 110. The signal paths are balanced in the sense that copies of a signal from a signal source can be transmitted in equal amplitude and phase to different RF outputs of the channel model. In FIG. 2, the channel model includes four signal paths that transmit copies of the signal from signal source 1 and signal source 2 to RF output 1 and RF output 2. Paths h11 and h21 transmit copies of the signal from signal source 1 to RF output 1 and RF output 2. Paths h12 and h22 transmit copies of the signal from signal source 2 to RF output 1 and RF output 2. Each of the signal paths can be enabled or disabled, and may be set to a constant gain and phase, depending on test procedures. The signal sources can represent a signal from a base station. The RF outputs can represent copies of the signal coupled to and broadcast by antennas within the test platform.

Figure 3:
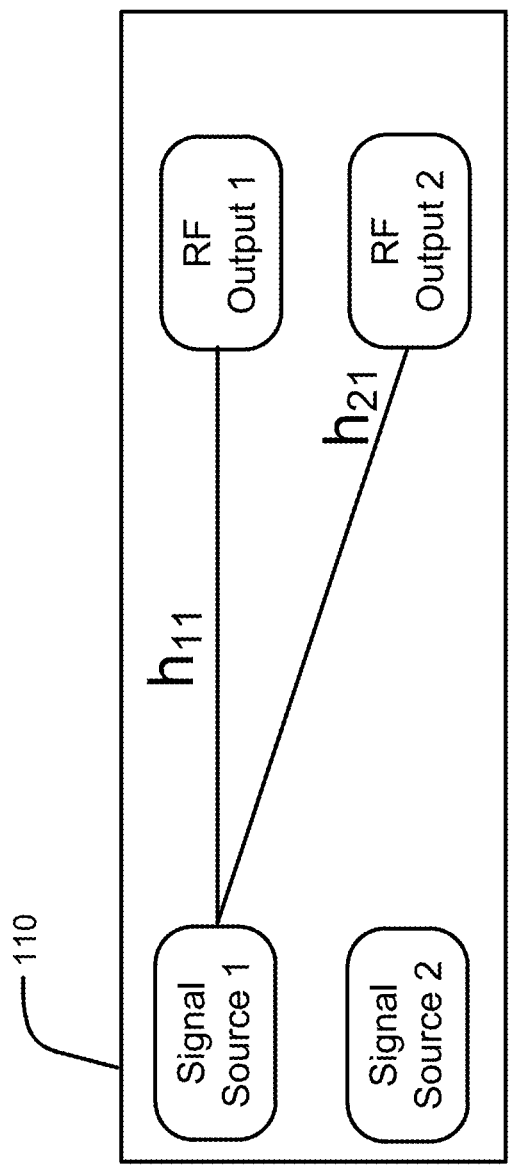
FIG. 3 illustrates the channel model of FIG. 2 when configured to direct copies of a signal from a signal source through balanced signal paths to different RF outputs.

FIG. 3 illustrates the channel model of FIG. 2 when configured to direct copies of a signal from a signal source through balanced signal paths to different RF outputs. Destructive interference due to different phases from multiple signal paths can reduce the power of the signal combined at an output of the channel emulator. The different phases from multiple signal paths can be caused by differences in lengths of cables connecting the network emulator 110 to the channel emulator 130, and by differences in phases through multiple paths inside the channel emulator from different inputs to each output of the channel emulator. A calibrated test platform can better ensure that combined power from copies of a signal transmitted on multiple signal paths represents the desired test condition.

The network emulator 110 can be configured to split a signal from a source (e.g. signal source 1 or signal source 2) into copies of the signal having equal amplitude and phase and feed the copies to RF output 1 and RF output 2. For initial calibration, one of the signal sources can be enabled while the other is disabled. This can be accomplished, for instance, by enabling one set of signal paths while disabling other signal paths from other signal sources. With copies of the signal transmitted in equal amplitude and phase from RF output 1 and RF output 2 of the network emulator (e.g. 110), for example by cables, phases between copies of the signal transmitted on multiple signal paths can be calibrated by setting input phase offsets at inputs of the channel emulator 130 to compensate for the differences in phases due to lengths of cables connecting the network emulator 110 to the channel emulator 130, and for the differences in internal phases through multiple paths inside the channel emulator from different inputs to each output of the channel emulator. In the event that there are differences in phase internal to the network emulator that are present at the outputs, this additional phase difference contribution will be included in the total phase difference, and will be compensated by the calibration.

As illustrated in the example of FIG. 3, signal paths h11 and h21 from a signal source, such as signal source 1, are enabled to transmit copies of the signal in equal amplitude and phase to RF output 1 and RF output 2 of the network emulator (e.g. 110), while paths h12 and h22 from signal source 2 are disabled. Alternatively, changed signal paths h21 and h22 from a changed signal source, such as signal source 2, can be enabled to transmit copies of the signal in equal amplitude and phase to RF output 1 and RF output 2, while signal paths h11 and h21 from signal source 1 can be disabled.

Once the network emulator (e.g. 110) transmits copies of the signal in equal amplitude and phase to RF output 1 and RF output 2, the network emulator (e.g. 110) can generate a radio signal, such as an LTE (long term evolution) radio signal, and the forward link throughput power can be measured, at different power levels for a given channel model, where the power levels are set by a channel emulator (e.g. 130). In the example illustrated in FIG. 2, for throughput measurements, signal path h11 from signal source 1 and signal path h22 from signal source 2 are enabled, while signal paths h12 and h21 are disabled.

Figure 4:
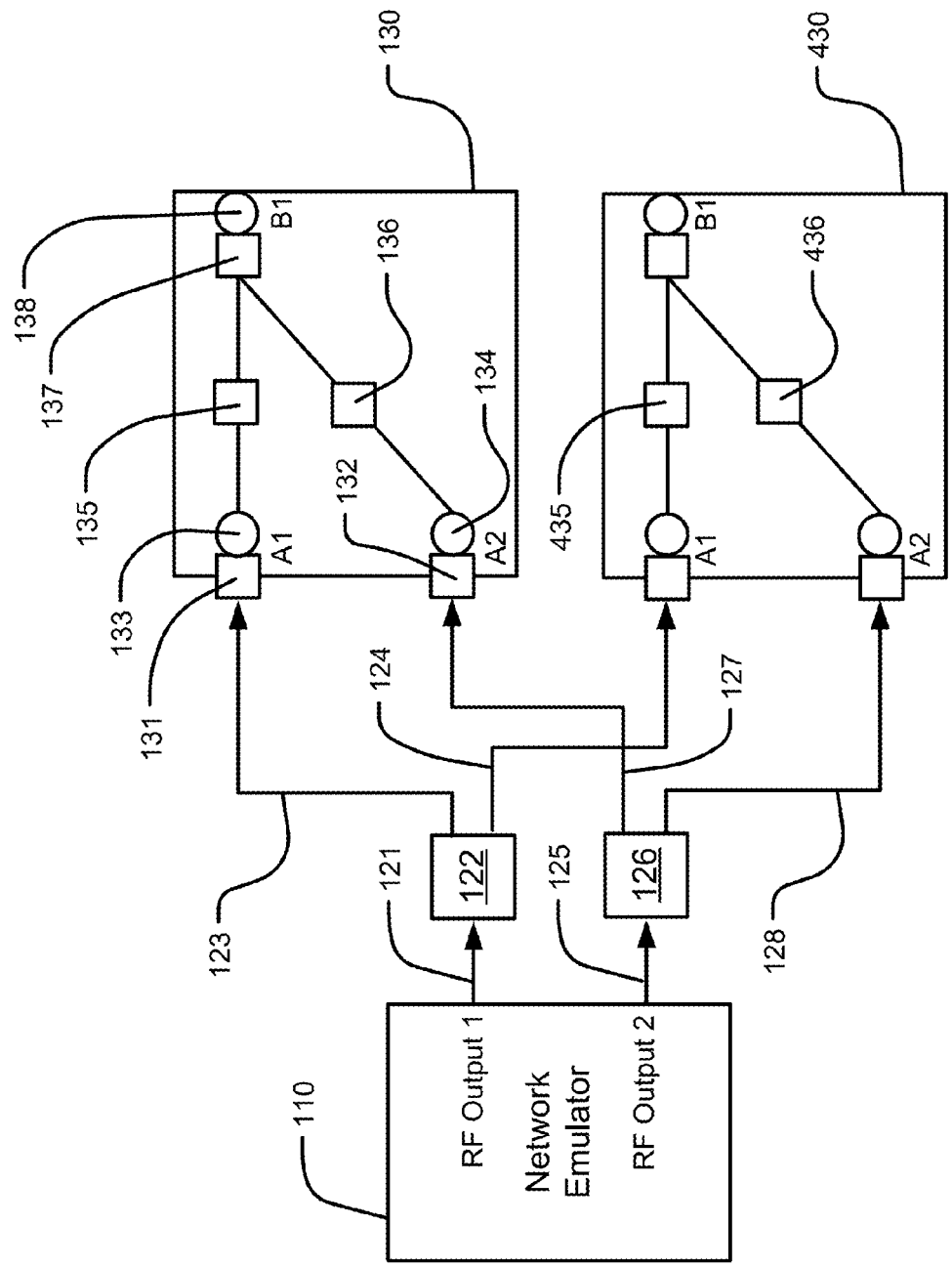
FIG. 4 is a more detailed block diagram of the test platform in FIG. 1.

FIG. 4 is a more detailed block diagram of the test platform in FIG. 1. As illustrated in the example of FIG. 4, network emulator 110 transmits copies of the signal in equal amplitude and phase from RF output 1 and RF output 2 to splitters 122 and 126 via connections 121 and 125. In turn, splitter 122 transmits the copy of the signal from RF output 1 to input A1 of channel emulator 130 and input A1 of channel emulator 131 via connections 123 and 124, and splitter 126 transmits the copy of the signal from RF output 2 to input A2 of channel emulator 130 and input A2 of channel emulator 131 via connections 127 and 128. In one implementation, connections 121, 123, 124, 125, 127 and 128 can include cables. In another implementation RF Output 1 is connected directly to input A1 and RF Output 2 is connected directly to input A2 on the first instrument, and copies of the two inputs signals are delivered to the second instrument over digital data cables after down conversion and analog to digital conversion.

Channel emulator 130 has input phase settings 131 and 132 at inputs A1 and A2, respectively, and can have an output phase setting 137 at output B1. A first signal path from input A1 to output B1 has a first phase 135, and a second signal path from input A2 to output B1 has a second phase 136. The first phase 135 and the second phase 136 can be different than each other. The output phase setting 137 at output B1 is common to the first path and the second path. Phase relationships of copies of a signal traversing through the test platform, including connections (e.g. 121, 123, 124, 125, 127 and 128) from the network emulator (e.g. 110) to the channel emulator (e.g. 131) and paths inside the channel emulator, can be calibrated by setting input phase offsets at the input phase settings (e.g. 131, 132).

The channel emulator (e.g. 131) includes input power meters 133 and 134 at inputs A1 and A2, respectively, and an output power meter 138 at output B1. The input power meters can confirm whether input power levels at inputs A1 and A2 are valid at a useful working level. The input power meters can, optionally, be used to confirm that the power levels of the inputs are equal or approximately so. The output power meter can measure the power at the output B1 that is combined from the power at the inputs A1 and A2.

Channel emulator 430 has similar physical components as channel emulator 130, including inputs A1 and A2, output B1, signal paths from the inputs to the output, input and output phase settings, and input and output power meters. In channel emulator 430, a first signal path from input A1 to output B1 has a first phase 435, and a second signal path from input A2 to output B1 has a second phase 436. The first phase 435 and the second phase 436 can be different than each other, and different than the first phase 135 and the second phase 136 in the channel emulator 130. Copies of the signal arriving at the inputs A1 and A2 of channel emulator 130 can have different phase relationships than copies of the signal arriving at the inputs A1 and A2 of channel emulator 430.

Figure 5:
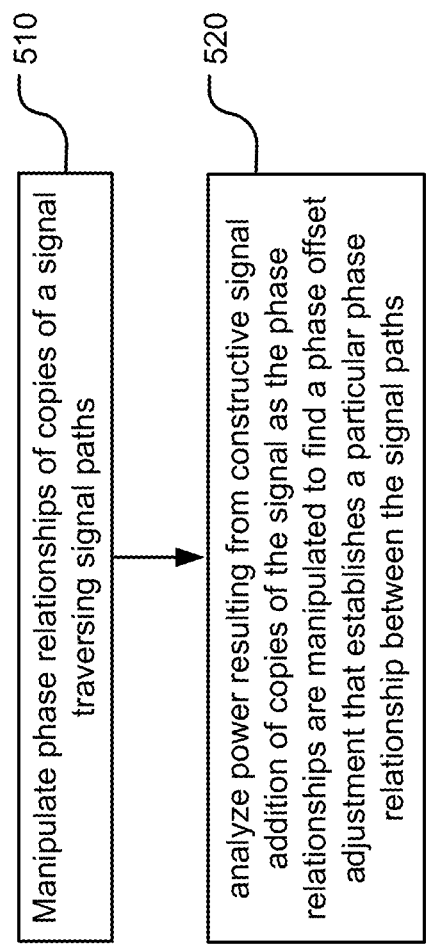
FIG. 5 is a flowchart for a method of calibrating a test platform to establish a phase relationship between copies of a signal.

FIG. 5 is a flowchart for a method of calibrating a test platform to establish a phase relationship between copies of a signal traversing signal paths. At Step 510, phase relationships of copies of a signal traversing signal paths are manipulated. At Step 520, the power resulting from the vector signal addition of the copies of the signals is analyzed as the phase relationships are manipulated to find a phase offset adjustment that establishes a particular phase relationship between the signal paths.

Figure 5A:
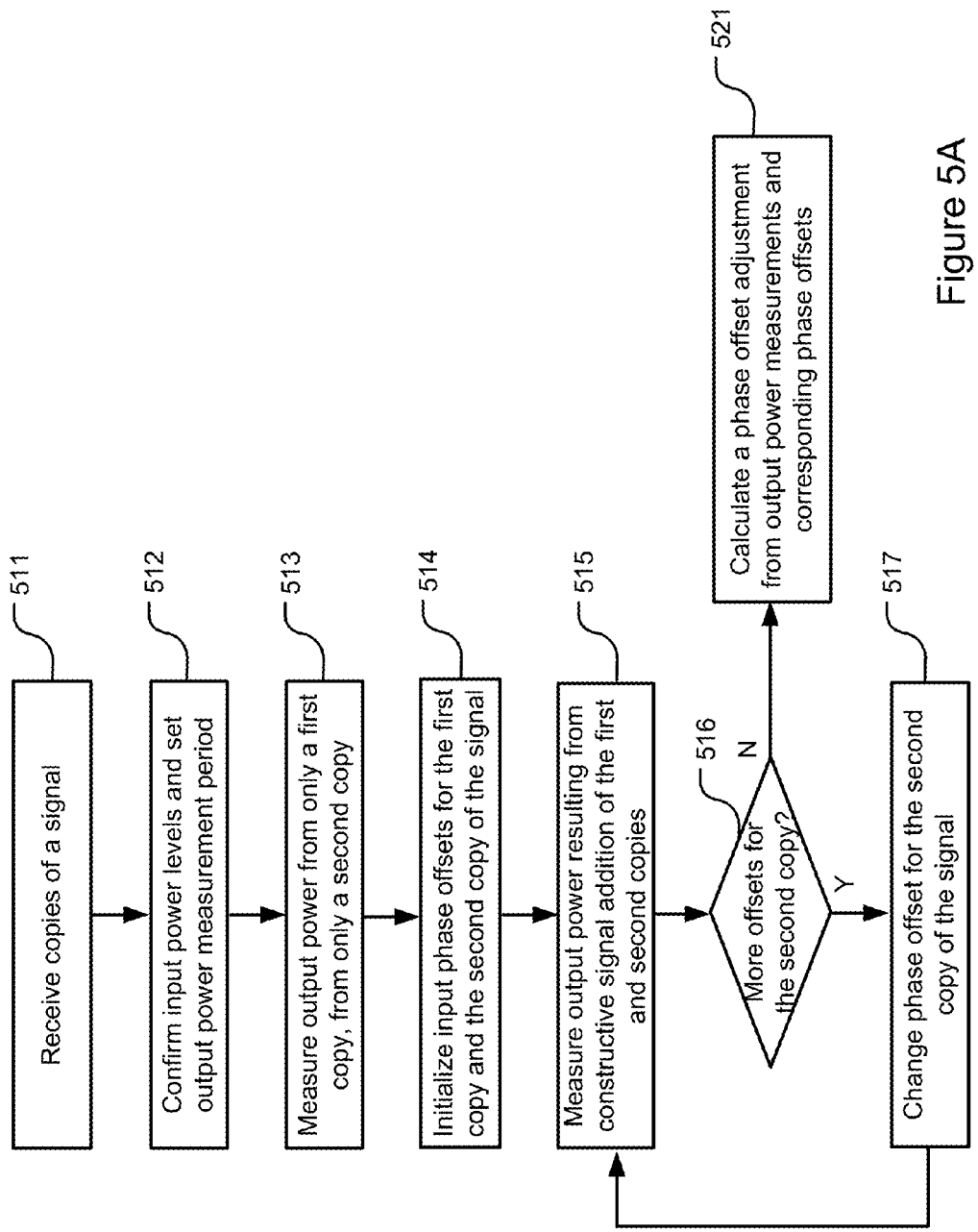
FIG. 5A is a flowchart illustrating an implementation of the method in FIG. 5.

FIG. 5A is a flowchart illustrating an implementation of the method in FIG. 5. In FIG. 5A, copies of a signal are received at a first input and a second input (e.g. A1 and A2) of channel emulator 130 (Step 511). Input power levels at the inputs are confirmed to be at a useful working level by input power meters (e.g. 133 and 134), and an output measurement period is set for an output power meter (e.g. 138), where the period is adequate for measuring power of sinusoids, such as 1 second (Step 512).

Output power can be measured at a measurement location, such as at ends of the signal paths, from only a first copy of the signal to obtain a first single-copy measurement of power (e.g. $P_1$), and from only a second copy of the signal to obtain a second single-copy measurement of power (e.g. $P_2$) (Step 513). The first single-copy measurement of power (e.g. $P_1$) and the second single-copy measurement of power (e.g. $P_2$) are used in calculating a phase offset adjustment, as described for Step 521.

A first copy and a second copy of the signal are set to an initial phase offset, such as 0°, at a first input phase setting (e.g. 131) and a second input phase setting (e.g. 132) of the channel emulator (e.g. 130) (Step 514). Output power resulting from the vector signal addition of the first copy and the second copy of the signal through the inputs A1 and A2 is measured at a measurement location, such as at the output B1 by the output power meter 138 (Step 515). The second copy of the signal is then set to each phase offset in a set of phase offsets at the input phase setting (e.g. 132), while the first copy of the signal is kept at the initial phase offset (Step 516, Y; Step 517). The output power is then measured at a measurement location, such as at the output B1, from the first copy and the second copy of the signal as the second copy is set to the each phase offset in the set of phase offsets (Step 515). The set of phase offsets is used to measure the effect on the combination of the copies of the signal at the output of the channel emulator (e.g. B1) and enable the calculation of the estimated initial phase offset. For instance, the set of phase offsets can include 0°, 72°, 144°, 216°, and 288°.

When output power measurements have been made for phase offsets in the set of phase offsets (Step 516, N), a phase offset adjustment is calculated from the output power measurements corresponding to the set of phase offsets (Step 521). The phase offset adjustment can then be set to the second copy of the signal at the second input phase setting while the first copy of the signal is kept at the initial phase offset. Consequently, the phase relationship between the first copy of the signal traversing the first signal path from input A1 to output B1 and the second copy of the signal traversing the second signal path from input A2 to output B1 in channel emulator 130 is calibrated. The phase relationship between the first signal path from input A1 to output B1 and the second signal path from input A2 to output B1 in another channel emulator (e.g. 430) that receives the same copies of the signal can be calibrated simultaneously.

A channel emulator can have more than two inputs and two outputs, such as A3 and A4, in addition to A1 and A2, and B3 and B4 in addition to B1 and B2. The example implementation in FIG. 5A can be repeated for pairs of inputs A1 and A2, A1 and A3, and A1 and A4, to find phase offset adjustments for inputs A2, A3 and A4, respectively. By directing each pair of inputs to a single output by enabling these paths in the channel emulator, pairs of inputs can be measured one pair at a time. During the measurement, all other inputs are not directed to the output used in the measurement. In the preferred method when three or more inputs are present, each output can be directed to receive signals from a different pair of inputs, with other inputs not directed to those outputs, so that each output power meter can measure the effect of the phase relationship of a unique pair of inputs. Thus the phase relationship between several pairs of inputs can be determined simultaneously.

The set of phase offsets includes a minimum number of phase offsets such that relatively accurate results can be obtained in relatively short time. As explained in more detail below, the calculation of the phase offset adjustment from output power measurements involves solving for an unknown phase offset using arc-cosine equations. For a first phase offset in the minimum number of phase offsets, there are two results from solving an arc-cosine equation. Only one of the two results can be correct, but not both. For a second phase offset in the minimum number of phase offsets, there are two other results from solving an arc-cosine equation. Only one of the two other results can be correct, but not both. By comparing the results for the first phase offset and the second phase offset, a first result and a second result can be identified, and then averaged to find the phase offset adjustment. Thus the set of phase offsets needs to include at least two phase offsets, in order to identify the expected value of the correct phase estimate. However, some combinations of values in the set of phase offsets when two or four phases are used may tend to produce ambiguous results for certain initial phase offsets when the incorrect predictions align, which increases the probability of an incorrect answer. Furthermore, a null in output power can occur at a particular input phase offset, and cannot be measured by a power meter. If the measured value is below a predetermined threshold, the value may be excluded from the calculation so that inaccurate estimates are avoided. The particular input phase offset is not initially known, because the unknown phase offset is to be solved.

Figure 6:
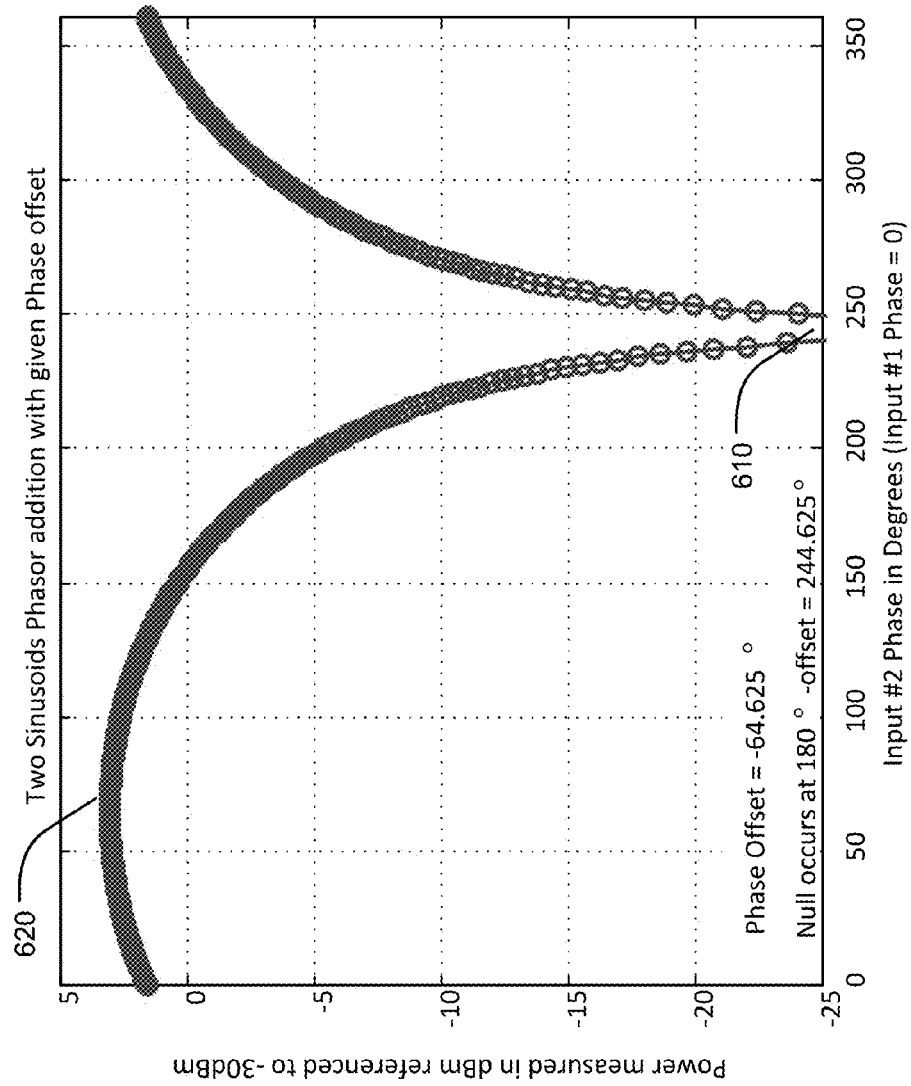
FIGS. 6, 7A and 7B illustrate a null and a peak in power as a function of input phase offsets.
Figure 7A:
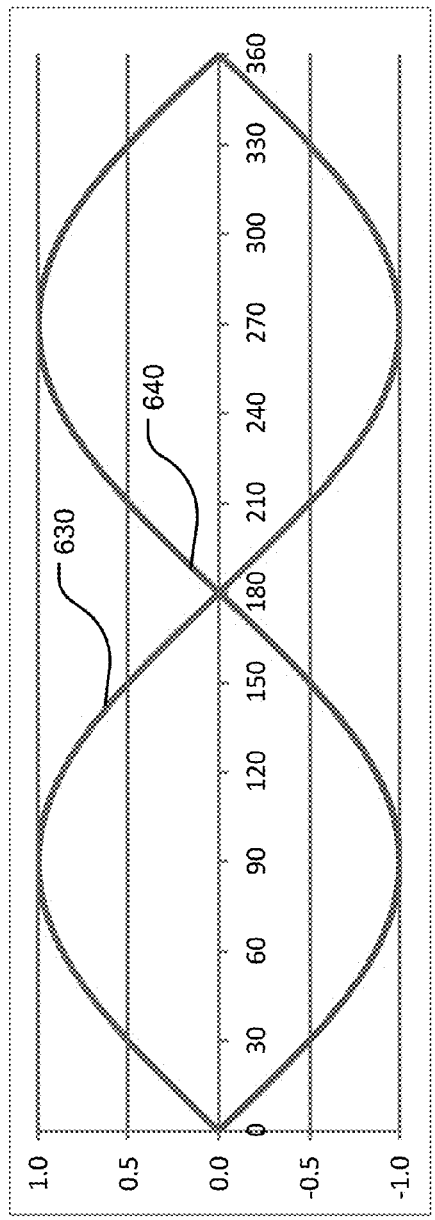
Figure 7B:
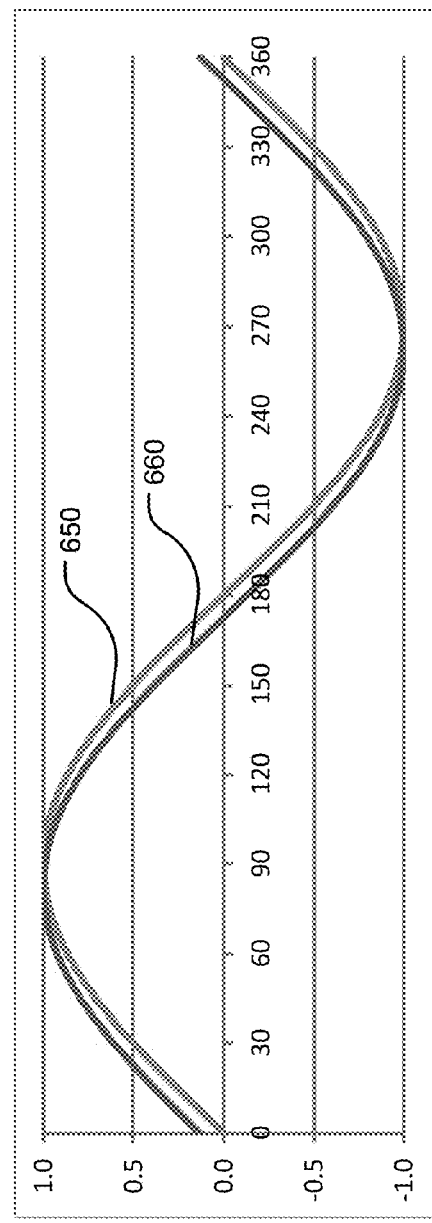

FIG. 6 illustrates combined power measured from two sinusoids representing two copies of a signal on the vertical axis, when the second copy of the signal is set to multiple input phase offsets between 0° and 360° on the horizontal axis, while the first copy of the signal is kept at the initial phase offset, such as 0°. As shown in FIG. 6, a null in output power (e.g. 610) only occurs at one input phase offset within a period of 360°, such as 244.625°, and a peak in output power (e.g. 620) occurs near an input phase offset of 64.5°, about 180° from the null. As illustrated in FIG. 7A, a first sinusoid 730 is 180° from phase alignment with a second sinusoid 740, corresponding to a phase relationship when a null in power can occur. As illustrated in FIG. 7B, a first sinusoid 750 is near phase alignment with a second sinusoid 760, corresponding to a phase relationship when a peak in power can occur.

If the set of phase offsets includes three phase offsets and one of them is at a null, then although the other two phase offsets may lead to a result, the result may not be accurate enough because it is difficult to get accurate power measurements. If the set of phase offsets includes four or more phase offsets and one of them is at a null, then the set of phase offsets can include at least three phase offsets at which a null in output power does not occur. In one implementation, a set of phase offsets includes a minimum number of five phase offsets evenly spaced, or 72° apart.

Calculation of the phase offset adjustment from the output power measurements corresponding to the input phase offsets is described below using equations.

Figure 8:
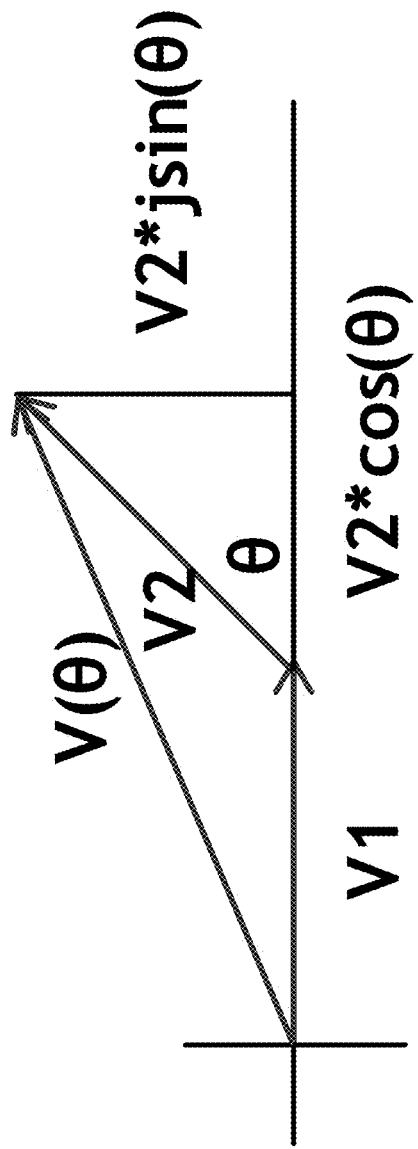
FIG. 8 illustrates addition of two phase vectors with a phase offset, representing two copies of a signal.

Complex wide-band modulated waveforms, e.g. an LTE band 13, 10 MHz downlink with Transmission Mode 3 may be used as a test signal. Alternatively, a sinusoid or Continuous Wave (CW) signal at the desired RF carrier frequency may be used. For purposes of following illustration, two copies of the signal are two sinusoidal waveforms with a phase difference. The two copies of the signal are represented by phase vectors, also known as phasors. A phase vector includes amplitude and phase. The two copies of the signal are represented by a first phase vector V1 at zero degrees, such as set at the first input phase setting 131, and a second phase vector V2 at a phase offset θ relative to the zero degrees, such as set at the second input phase setting 132. A combined vector V(θ) is added from the first phase vector V1 and the second phase vector V2. FIG. 8 illustrates addition of the first phase vector V1 and the second phase vector V2 at phase offset θ. The complex conjugate of the vector V(θ) is V*(θ)= $V_1+V_2(\cos(\theta)-j\sin(\theta))$, where the sign of the imaginary part is reversed from the sign of the imaginary part in the vector V(θ). Power P(θ) is the product of the vector V(θ) and the complex conjugate V*(θ). Power P(θ) can be calculated for the combined vector V(θ):

$$V(\theta)=V_1+V_2(\cos(\theta)+j\sin(\theta))$$

$$P(\theta)=V^*V^*=(V_1+V_2\cos(\theta)+V_2 j\sin(\theta))(V_1+V_2\cos(\theta)-V_2 j\sin(\theta))$$

$$P(\theta)=P_1+P_2+2\sqrt{P_1P_2}\cos(\theta)$$

where $P_1$ is a first single-copy measurement of power at ends of the signal paths (e.g. B1, FIG. 4) from only a first copy of the signal, for example through the first A1, and $P_2$ is a second single-copy measurement of power at the ends of the signal paths from only a second copy of the signal, for example through the second input A2.

Thus when evaluating copies of the signal with an unknown phase offset φ, by substituting (θ−φ) for (θ), power can be calculated as:

$$P(\theta-\phi)=P_1+P_2+2\sqrt{P_1P_2}\cos(\theta-\phi)$$

The unknown phase offset φ represents the effective phase difference due to differences in lengths of cables connecting different pieces of test equipment in the test platform, such as the network emulator 110 and the channel emulator 130, and differences in phases through multiple paths inside the channel emulator. The phase difference may also include differences in phase present in the output signals of the network emulator due to differences in internal circuitry or electrical lengths inside the equipment.

If the second copy of the signal is set to a first input phase offset $\theta_1$, and a second input phase offset $\theta_2$, while the first copy of the signal is kept at an initial phase offset, then by substituting $(\theta_1-\phi)$ and $(\theta_2-\phi)$ for $(\theta-\phi)$, the combined power at ends of the signal paths from the first copy and the second copy when the second copy is set to each of $\theta_1$ and $\theta_2$ can be calculated as:

$$P(\theta_1-\phi)=P_1+P_2+2\sqrt{P_1P_2}\cos(\theta_1-\phi)$$

$$P(\theta_2-\phi)=P_1+P_2+2\sqrt{P_1P_2}\cos(\theta_2-\phi)$$

By rearranging the equations for $P(\theta_1-\phi)$ and $P(\theta_2-\phi)$, a first unknown phase offset φ1, and a second unknown phase offset φ2 can be solved by:

$$\phi_1=\theta_1-\text{arc-cosine}(P(\theta_1-\phi)-P_1-P_2)/(2\times\text{square-root}(P_1\times P_2));$$

$$\phi_2=\theta_2-\text{arc-cosine}(P(\theta_2-\phi)-P_1-P_2)/(2\times\text{square-root}(P_1\times P_2));$$

Figure 9:
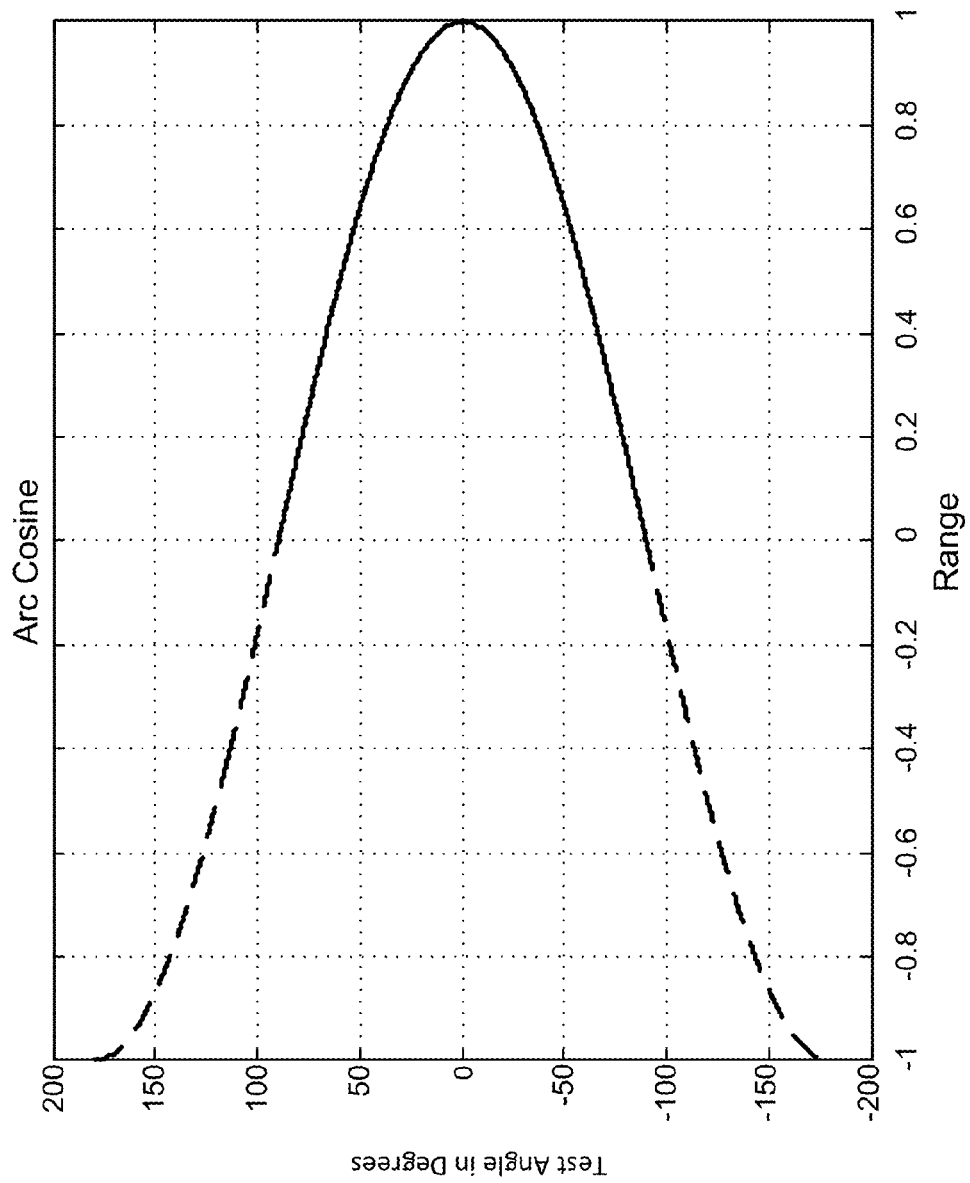
FIG. 9 illustrates that arc-cosine has two possible results for each test angle evaluated.

FIG. 9 illustrates that arc-cosine is not a function because arc-cosine has two possible results for each test angle (i.e. input phase offset) evaluated. The first unknown phase offset φ1 can includes two results $\phi_1'$ and $\phi_1''$ corresponding to the first input phase offset $\theta_1$, and the second unknown phase offset φ2 can include two other results $\phi_2'$ and $\phi_2''$ corresponding to the second input phase offset $\theta_2$:

$$\phi_1' = \theta_1 + a\cos\left(\frac{P(\theta_1+\phi)-P_1-P_2}{2\sqrt{P_1P_2}}\right)$$

$$\phi_1'' = \theta_1 - a\cos\left(\frac{P(\theta_1-\phi)-P_1-P_2}{2\sqrt{P_1P_2}}\right)$$

$$\phi_2' = \theta_2 + a\cos\left(\frac{P(\theta_2+\phi)-P_1-P_2}{2\sqrt{P_1P_2}}\right)$$

-continued $$\phi_2'' = \theta_2 - a\cos\left(\frac{P(\theta_2 - \phi) - P_1 - P_2}{2\sqrt{P_1 P_2}}\right)$$

For example, if P1=−31.7 dBm, P2=−33.1 dBm, $\theta_1$=30°, $\theta_2$=135°, and measured power is:

$P(\theta_1-\phi)$=2.3122 dBm for input phase offset $\theta_1$, and $P(\theta_2-\phi)$=0.9683 dBm for input phase offset $\theta_2$, then for the first input phase offset $\theta_1$, there are two results $\phi_1'$ and $\phi_1''$, and for the second input phase offset $\theta_2$, there are two results $\phi_2'$ and $\phi_2''$:

$\phi_1'$=35.115°

$\phi_1''$=24.886°

$\phi_2'$=234.886°

$\phi_2''$=35.115°

A first result (e.g. $\phi_1'$) from the two results of the first unknown phase offset (e.g. $\phi_1'$ and $\phi_1''$), and a second result (e.g. $\phi_2''$) from the two other results of the second unknown phase offset ($\phi_2'$ and $\phi_2''$) can be identified, where the first result and the second result are closer to each other than to other results of the first unknown phase offset and the second unknown phase offset (e.g. $\phi_1''$, $\phi_2'$). The first result and the second result can then be averaged to improve the estimate of the phase offset adjustment that establishes a particular phase relationship between the two copies of the signal, such that, for example, the two copies of the signal are phase aligned at ends of the signal paths.

Figure 10:
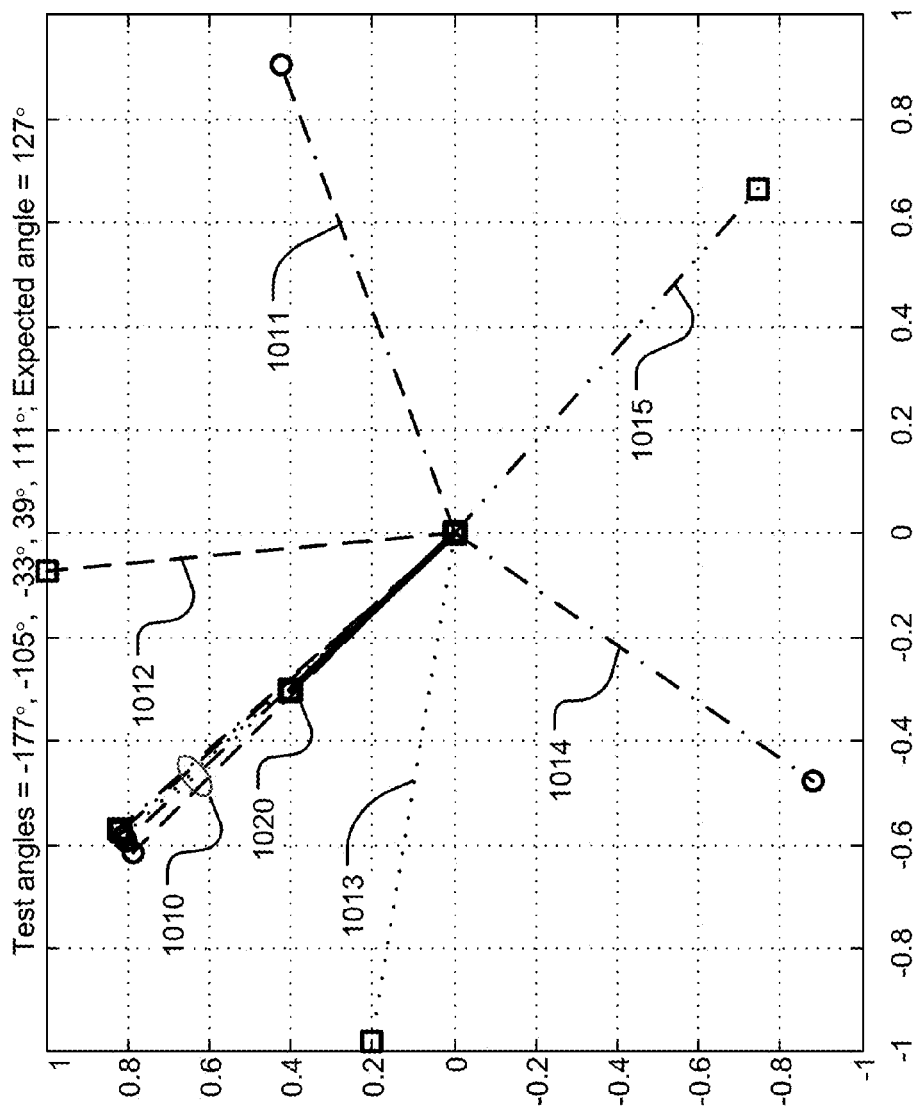
FIG. 10 illustrates analyzing results from manipulating phase relationships using a set of test angles.

FIG. 10 illustrates analyzing results from manipulating phase relationships using the method as described in connection to the flowchart in FIG. 5A. In particular, the method includes setting an initial phase offset to two inputs, measuring output power resulting from vector signal addition of two copies of a signal from the two inputs, stepping through input phase offsets (e.g. test angles) in a set of phase offsets having a minimum number of phase offsets, and measuring output power corresponding to the phase offsets in the set. When output power measurements have been made for phase offsets in the set of phase offsets, a phase offset adjustment is calculated from the output power measurements corresponding to the set of phase offsets.

The X-axis and the Y-axis in FIG. 10 represents the complex plane for plotting the magnitude and phase of the normalized vectors illustrating the calculated phase estimators based on each measured power for the set of test angles. Pairs of results for five example test angles −177°, −105°, −33°, 39° and 111° are obtained using the present method. The expected angle (e.g. 1020) of 127° is superimposed on the pairs of results. Although five test angles 72° apart are used, other number of test angles can be used. The test angles may be equally spaced about the circle, or may be unequally spaced. A measurement at a test angle may be ignored if it is outside the normal range of the power meter, and may also be repeated at a substitute test angle if desired. The expected angle is obtained from lab measurements and used to test the performance of estimating the phase offset. Each pair of results corresponds to a test angle and includes a first result marked with a square and a second result marked with a circle. The first and second results are from solving for the unknown phase offset using the arc-cosine equations as described above. Only one of the first and second results can be correct, but not both.

As illustrated in the example of FIG. 10, the correct results tend to be in a cluster 1010 near the expected angle. Incorrect results 1011, 1012, 1013, 1014 and 1015 are farther from the cluster. Each correct result in the cluster is in a pair with an incorrect result outside the cluster. The cluster can be determined by finding the lowest angle differences among results for different test angles. An average of the results in the cluster can be used as the phase offset adjustment that establishes a particular phase relationship between the signal paths. Alternatively, the cluster can be determined by finding the lowest angle differences among results from a subset of the different test angles, in order to reduce the effects of outliers that may occur due to the normal and expected variations in the power measurements.

Figure 11:
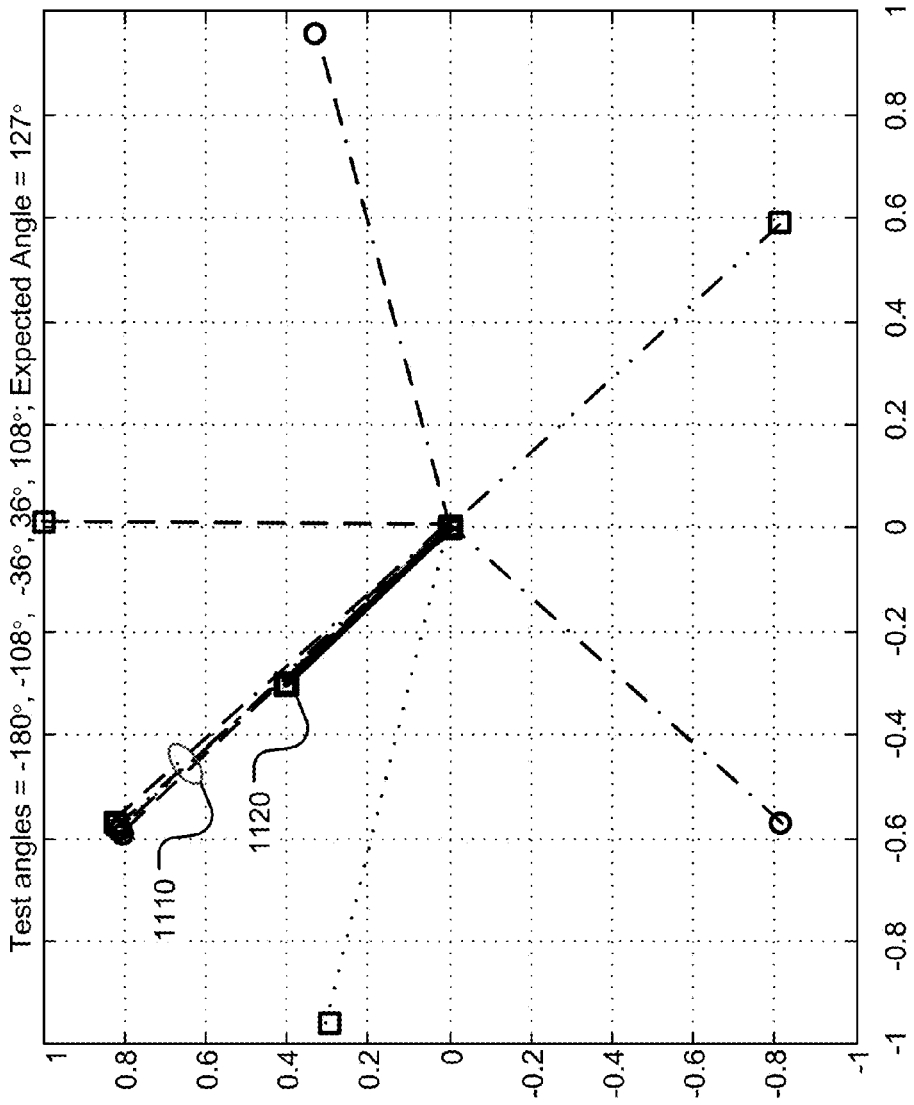
FIG. 11 illustrates analyzing results from using a second set of test angles that is not aligned with an expected angle.

FIG. 11 illustrates analyzing results from using a second set of test angles that is not aligned with an expected angle. The expected angle is 127° (e.g. 1120), while test angles are −180°, −108°, −36°, 36° and 108°, thus the expected angle is not aligned with a test angle. As illustrated in the example of FIG. 11, the correct results tend to be in a cluster 1110 near the expected angle 1120. The phase offset adjustment obtained from averaging the correct results in the cluster 1110 aligns with the expected angle 1120.

Figure 12:
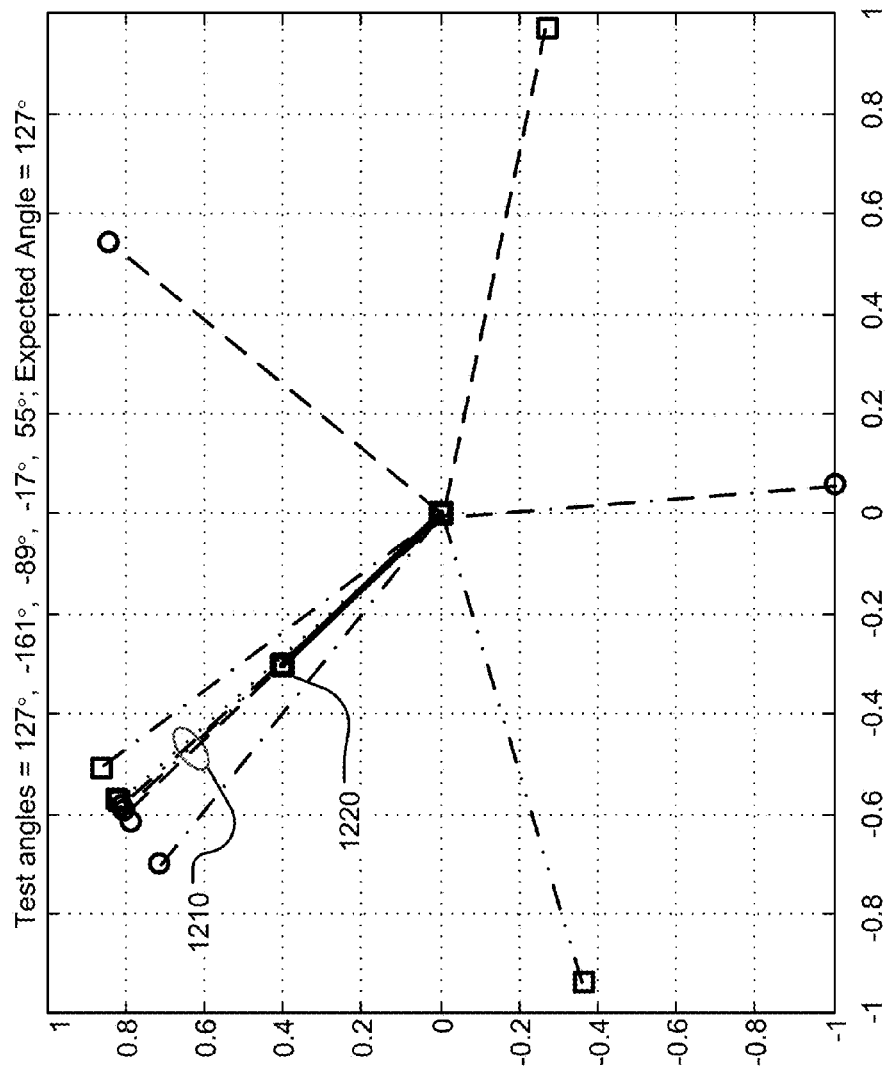
FIG. 12 illustrates analyzing results from using a third set of test angles that includes a test angle aligned with an expected angle.

FIG. 12 illustrates analyzing results from using a third set of test angles that includes a test angle aligned with an expected angle. The expected angle is 127° (e.g. 1220), while test angles are 127°, −161°, −89°, −17°, and 55°, thus the expected angle is aligned with the test angle 127°. As illustrated in the example of FIG. 12, the correct results tend to be in a cluster 1210 near the expected angle 1220. Two values are observed to be near the cluster, but somewhat further away than two other values. These two other values result from the null, wherein the test angle is aligned with the null and it results in a phase estimate with high uncertainty due to reduced accuracy of the power measurement. By using a threshold to remove values that result from the null, these phase estimates may be ignored and not lead to higher uncertainty. Alternatively, the cluster can be determined by finding the lowest angle differences among results from a subset of the different test angles, in order to reduce the effects of these outliers. Thus by limiting the number of values averaged together, the correct results in the cluster 1210 align with the expected angle 1220.

Figure 13:
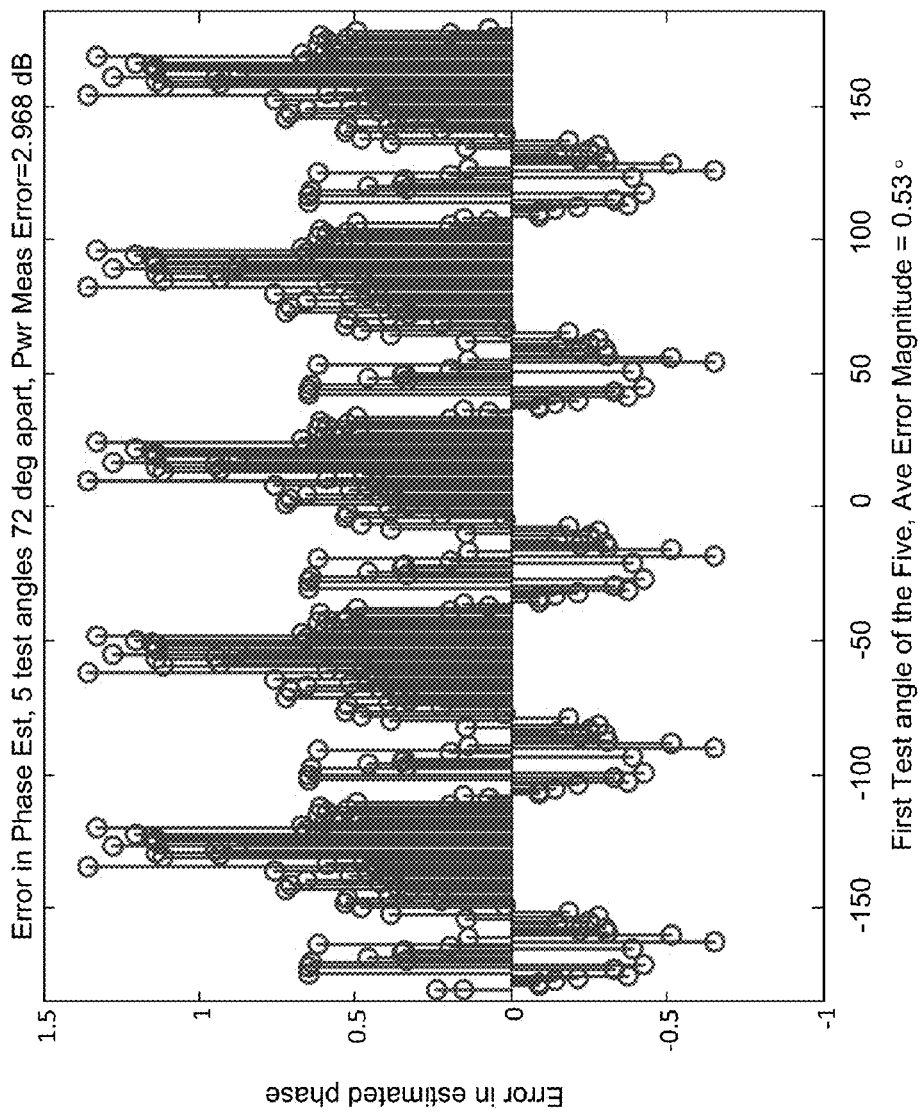
FIG. 13 illustrates errors in estimated phase offset adjustment using a set of test angles.

FIG. 13 illustrates errors in estimated phase offset adjustment using a set of test angles. For example, the set of test angles includes five test angles −180°, −108°, −36°, 36° and 108°, as used with FIG. 10. Then a new estimate is made with the test angles being incremented by 1°, i.e. −179°, −107°, −35°, 37° and 109°, to estimate the same offset. Again an error is recorded and the process is repeated for every 1° step in the set of test angles. The X axis of the plot is referenced to the first angle in the set of test angles. Errors in estimated phase offset are observed to vary between about −0.7° and 1.3°, and therefore relatively small.

Notice that there appears to be 5 repeats in the error plot, which is due to the test angles being equally spaced. The errors are due in large part to the non-ideal behavior of the power meters, which tends to produce a small variation in the measurement.

Figure 14:
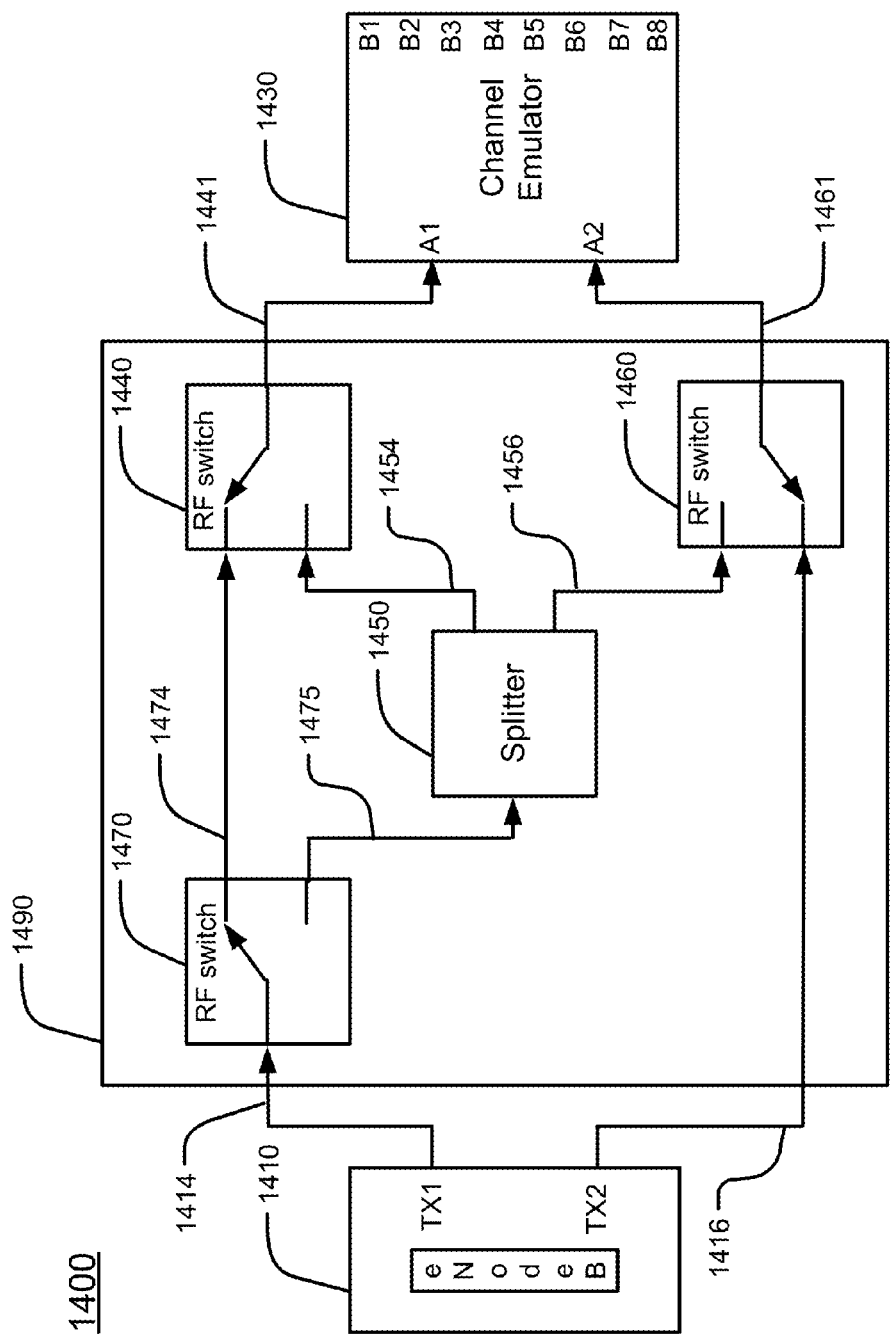
FIG. 14 is a simplified block diagram of an alternative implementation of the test platform to establish a phase relationship between two copies of a version of a signal from a base station.

FIG. 14 is a simplified block diagram of an alternative implementation of the test platform to establish a phase relationship between two copies of a version of a signal from a base station. As illustrated in the example of FIG. 14, a test platform 1400 includes a base station 1410 that includes an eNodeB. The eNodeB is specified in the ETSI TS 136-series technical specification. The base station has a pair of signal sources, such as a first output TX1 and a second output TX2. The pair of signal sources can generate versions of a signal (e.g. 1414 and 1416) for calibrating the test platform 1400.

The test platform 1400 includes a channel emulator 1430, including inputs and outputs, signal paths from inputs to outputs, input and output phase settings, and input and output power meters such as described for channel emulator 130 in connection with FIG. 1 and FIG. 4.

The test platform 1400 includes a calibration box 1490, including RF switches 1470, 1440 and 1460, and a splitter 1450. The splitter 1450 can be a wide-band, zero-phase splitter. The splitter 1450 can receive a signal from the RF switch 1470, and output two copies of the signal (e.g. 1454 and 1456) to RF switches 1440 and 1460.

The calibration box 1490 can be in a first switching state to direct a signal from a signal source of the base station (e.g. output TX1) to outputs of the RF switches 1440 and 1460, for input phase calibration. In the first switching state, the signal from TX1 is directed through the RF switch 1470 to the splitter 1450 via a signal path 1475. A first copy of the signal from TX1 is directed from the splitter 1450 to the RF switch 1440 via a signal path 1454. A second copy of the signal from TX1 is directed from the splitter 1450 to the RF switch 1460 via a signal path 1456. The first copy and second copy of the signal from TX1 are then directed to outputs of the RF switches 1440 and 1460, respectively. The RF switches 1440, 1460, and 1470 may be operated manually or operated electrically by a system controller (not shown).

The calibration box 1490 can be in a second switching state to direct versions of the signal from signal sources of the base station (e.g. outputs TX1 and TX2) to outputs of the RF switches 1440 and 1460, for throughput power measurements. In the second switching state, a version of the signal from TX1 is directed through the RF switch 1470, and to the RF switch 1440 via a signal path 1474, another version of the signal from TX2 is directed to the RF switch 1460, while the splitter is not used. The two versions of the signal from TX1 and TX2 are then directed to outputs of the RF switches 1440 and 1460. Switch positions shown in the example of FIG. 14 correspond to the second switching state for throughput power measurements.

The channel emulator 1430 receives signals 1441 and 1461 from outputs of the RF switches 1440 and 1460. Thus depending on switching states of the calibration box 1490, the channel emulator 1430 can establish a phase relationship between two copies of a version of the signal from an output of the base station (e.g. TX1), or measure throughput power of versions of the signal from outputs of the base station (e.g. TX1 and TX2).

Figure 15:
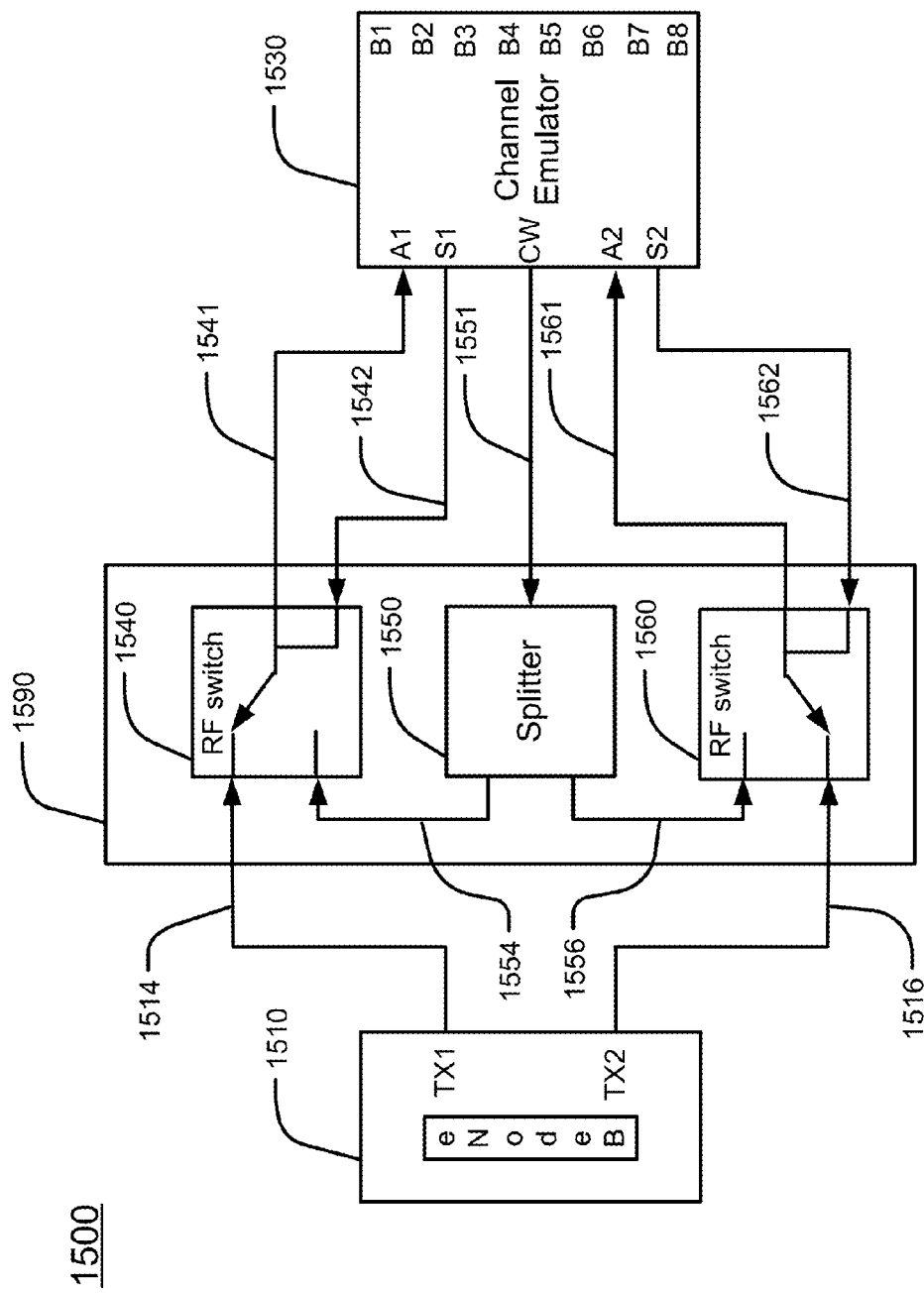
FIG. 15 is a simplified block diagram of an alternative implementation of the test platform to establish a phase relationship between two copies of a signal from one of two types of signal sources.

FIG. 15 is a simplified block diagram of an alternative implementation of the test platform to establish a phase relationship between two copies of a signal from one of two types of signal sources. As illustrated in the example of FIG. 15, a test platform 1500 includes a base station 1510 that includes an eNodeB. The base station has a pair of signal sources, such as a first output TX1 and a second output TX2. The pair of signal sources can generate versions of a signal (e.g. 1514 and 1516) of a first signal type. The first signal type can be a wide-band signal.

The test platform 1500 includes a channel emulator 1530, including inputs and outputs, signal paths from inputs to outputs, input and output phase settings, and input and output power meters such as described for channel emulator 130 in connection with FIG. 1 and FIG. 4. Channel emulator 1530 generates a signal of a second signal type, such as a CW (continuous wave) signal 1551, and receives two copies of a signal of either the first signal type or the second signal type at inputs A1, and A2.

The test platform 1500 includes a calibration box 1590, including a first RF switch 1540, a second RF switch 1560, and a splitter 1550. The splitter 1550 receives the CW signal 1551 from the channel emulator 1530, and generates a first copy 1554 and a second copy 1556 of the CW signal 1551.

Channel emulator 1530 generates a first select signal 1542 for the first RF switch 1540 to switch between receiving a first copy of the signal from TX1 of the base station 1510 (e.g. 1514), and receiving a first copy of the CW signal 1551 from the splitter 1550 (e.g. 1554). Channel emulator 1530 generates a second select signal 1562 for the second RF switch 1560 to switch between receiving a second copy of the signal from TX2 of the base station 1510 (e.g. 1516), and receiving a second copy of the CW signal 1551 from the splitter 1550 (e.g. 1556).

The channel emulator 1530 receives signals 1541, and 1561 from outputs of the first RF switch 1540 and the second RF switch 1560, respectively. Thus depending on the first select signal 1542 and the second select signal 1562, the channel emulator 1530 can receive copies of a wide-band signal from the base station, or copies of the CW signal from the channel emulator. The method for calibrating a test platform to establish a phase relationship between copies of a signal as described herein can be applied to two or more copies of a signal of different types, including a wide-band signal and a CW signal.

Figure 16:
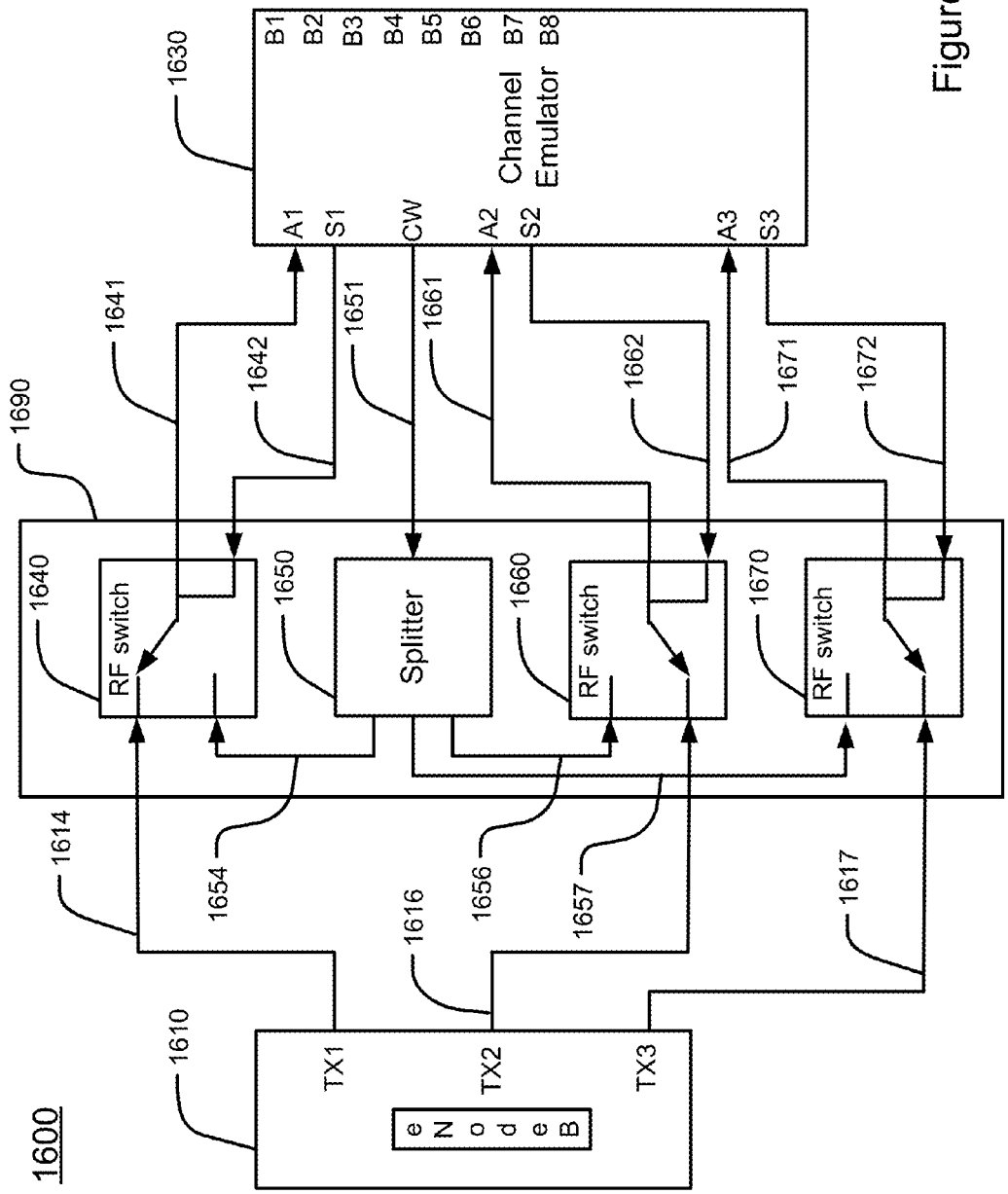
FIG. 16 is a simplified block diagram of an alternative implementation of the test platform to establish a phase relationship between three copies of a signal from one of two types of signal sources.

FIG. 16 is a simplified block diagram of an alternative implementation of the test platform to establish a phase relationship between three copies of a signal from one of two types of signal sources. As illustrated in the example of FIG. 16, a test platform 1600 includes a base station 1610 that includes an eNodeB. The base station has a trio of signal sources, such as a first output TX1, a second output TX2, and a third output TX3. The trio of signal sources can generate three versions of a signal (e.g. 1614, 1616 and 1617) of a first signal type. The first signal type can be a wide-band signal.

The test platform 1600 includes a channel emulator 1630, including inputs and outputs, signal paths from inputs to outputs, input and output phase settings, and input and output power meters such as described for channel emulator 130 in connection with FIG. 1 and FIG. 4. Channel emulator 1630 generates a signal of a second signal type, such as a CW signal 1651, and receives three copies of a signal of either the first signal type or the second signal type at inputs A1, A2 and A3.

The test platform 1600 includes a calibration box 1690, including a first RF switch 1640, a second RF switch 1660, a third RF switch 1670, and a splitter 1650. The splitter 1650 receives the CW signal 1651 from the channel emulator 1630, and generates a first copy 1654, a second copy 1656, and a third copy 1657 of the CW signal 1651. Alternatively, the CW signal may be supplied from an external RF generator that is set to the desired amplitude and frequency. A wide-band modulated signal may also be used.

Channel emulator 1630 generates a first select signal 1642 for the first RF switch 1640 to switch between receiving a first copy of the signal from TX1 of the base station 1510 (e.g. 1614), and receiving a first copy of the CW signal 1651 from the splitter 1650 (e.g. 1654). Channel emulator 1630 generates a second select signal 1662 for the second RF switch 1660 to switch between receiving a second copy of the signal from TX2 of the base station 1610 (e.g. 1616), and receiving a second copy of the CW signal 1651 from the splitter 1650 (e.g. 1656). Channel emulator 1630 generates a third select signal 1672 for the third RF switch 1670 to switch between receiving a third copy of the signal from TX3 of the base station 1610 (e.g. 1617), and receiving a third copy of the CW signal 1651 from the splitter 1650 (e.g. 1657).

The channel emulator 1630 receives signals 1641, 1661, and 1671 from outputs of the first RF switch 1640, the second RF switch 1660, and the third RF switch 1660, respectively. Thus depending on the first select signal 1642, the second select signal 1662, and the third select signal 1672, the channel emulator 1630 can receive three copies of a wide-band signal from the base station, or three copies of the CW signal from the channel emulator. The method for calibrating a test platform to establish a phase relationship between copies of a signal as described herein can be applied to two, three, or more copies of a signal of different types, including a wide-band signal and a CW signal.

Figure 17:
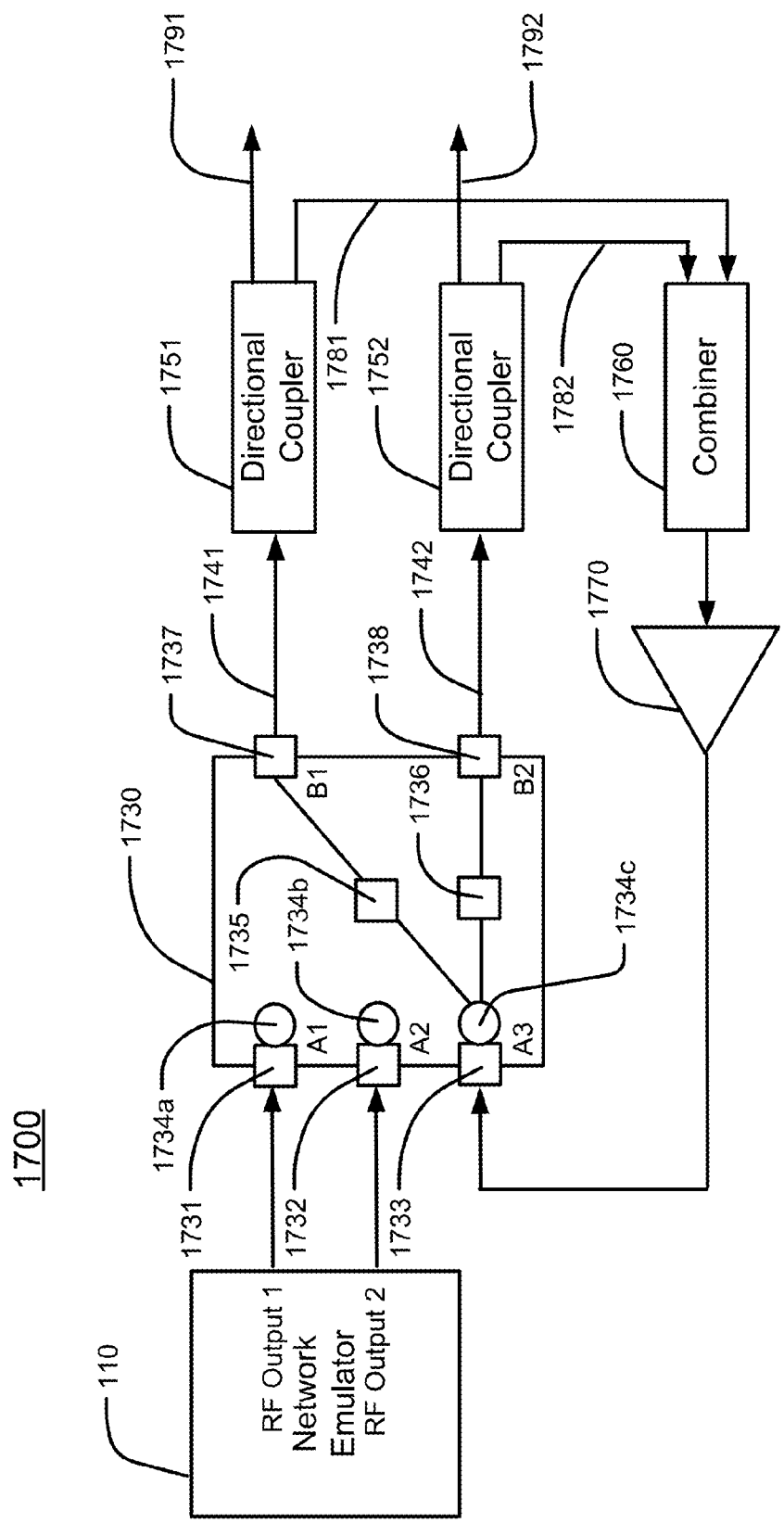
FIG. 17 is a simplified block diagram of an implementation of a test platform to establish a phase relationship between copies of a signal at ends of output cables.

FIG. 17 is a simplified block diagram of an implementation of a test platform (e.g. 1700) to establish a phase relationship between copies of a signal at ends of output cables. As illustrated in the example of FIG. 17, channel emulator 1730 has input phase settings 1731, 1732 and 1733 at inputs A1, A2 and A3 respectively, and has output phase settings 1737 and 1738 at outputs B1 and B2 respectively. Channel emulator 1730 can also have input power meters 1734a, 1734b and 1734c at inputs A1, A2 and A3 respectively. A first signal path from input A3 to output B1 has a first phase 1735, and a second signal path from input A3 to output B2 has a second phase 1736. The first phase 1735 and the second phase 1736 can be different than each other. The input phase setting 1731 at input A3 is common to the first path and the second path. Output cables 1741 and 1742 are connected to outputs B1 and B2, respectively. Output phase relationships of copies of a signal traversing signal paths including output cables 1741 and 1742 can be calibrated by manipulating output phase offsets at the output phase settings (e.g. 1737, 1738).

The test platform 1700 includes directional couplers that receive signals from outputs of the channel emulator via cables (e.g. 1741, 1742) that may have unequal lengths, and a combiner that combines signals from the directional couplers. Although directional couplers are shown, splitters or RF switches could also be used. For instance, directional coupler 1751 receives a signal from output B1 via cable 1741, directional coupler 1752 receives a signal from output B2 via cable 1742, and the signals are provided to the combiner 1760 through cables 1781 and 1782, which are of approximately equal length. Directional couplers 1751 and 1752 can provide output signals 1791 and 1792 to a test device (e.g. 190, FIG. 1). If splitters or RF switches are used instead of directional couplers, splitters or RF switches can also provide output signals to a device under test. The combiner combines signals from the directional couplers 1751 and 1752. Although only two directional couplers are shown, the test platform 1700 can include more directional couplers for more outputs of the channel emulator, and the combiner can combine signals from the directional couplers. If RF switches are used instead of directional couplers in blocks 1751 and 1752, then the RF switches must be activated to direct the signals to the combiner through cables 1781 and 1782 while the phase relationships between the output signals are evaluated. If more than two outputs are being evaluated, then pairs of outputs are evaluated at one time. If the phase difference between the directional couplers, feed cables 1781 and 1782, and the combiner are not matched, then any offset present, if known, could be removed from the final estimate of the phase offset.

Power level of a signal can decrease as the signal traverses through the directional couplers and the combiner. An amplifier (e.g. 1770) connected to an output of the combiner (e.g. 1760) amplifies the power level of the signal to a level appropriate for the channel emulator input. The combined power at the output of the combiner can be measured at an input (e.g. A3) of the channel emulator 1730 with an input power meter (e.g. 1734c), or an external power meter (not shown). If additional power meters are connected to unique pairs of outputs, e.g. a first power meter is connected to the combined pair B1 and B2, and a second power meter is connected to the combined pair B1 and B3, then each pair can be measured and the phase relationship between output signals can be evaluated simultaneously.

As described herein, FIG. 5 is a flowchart for calibrating a test platform to establish a phase relationship between copies of a signal traversing signal paths. At Step 510, phase relationships of copies of a signal traversing signal paths are manipulated. At Step 520, power resulting from vector signal addition of the copies of the signal are analyzed as the phase relationships are manipulated to find a phase offset adjustment that establishes a particular phase relationship between the signal paths. The phase relationship can be an input phase relationship as described in connection to FIG. 4, or an output phase relationship as described in connection to FIG. 17. In reference to FIG. 4, the phase relationships are manipulated by setting input phase offsets at inputs of a channel emulator, and power resulting from the vector signal addition of the copies of the signal from the inputs is analyzed at an output of the channel emulator that combines power from multiple inputs. In reference to FIG. 17, the phase relationships are manipulated by setting output phase offsets at outputs of the channel emulator, and power resulting from vector signal addition of the copies of the signal from the outputs is analyzed at an input of the channel emulator where combined power from ends of output cables connected to multiple outputs of the channel emulator is measured.

In one implementation, an input phase relationship is first established between signals traversing signal paths through inputs (e.g. A1 and A2) of the channel emulator 130, as described in connection to FIG. 4 and FIG. 5. As illustrated in the example of FIG. 17, copies of a signal are received at outputs B1 and B2 of channel emulator 1730 from input A3, and transmitted to directional couplers 1751 and 1752 via cables 1741 and 1742. Combiner 1760 combines the power on cables 1781 and 1782 from the directional couplers, and amplifier 1770 amplifiers the combined power for output power measurement at input A3. Input power meter 1734c is set to a measurement period adequate for sinusoids, such as 1 second.

A first output phase setting at output B1 (e.g. 1737) is set to an initial phase offset, e.g. 0°, although another value could be used, and a second output phase setting at output B2 (e.g. 1738) of the channel emulator (e.g. 1730) is set to the first test angle. The input power meter (e.g. 1734c) measures the combined power at the input A3 received from the amplifier 1770, where the combined power corresponds to the phase difference observed at the first test angle. Each phase offset in a set of phase offsets is applied to the second output and the combined power is measured, while the first output phase setting is kept at the initial phase offset. The input power meter measures the combined power at the input A3, where the combined power corresponds to each phase offset in the set of phase offsets. The set of phase offsets is determined to reduce destructive addition of power from the copies of signal at ends of the output cables (e.g. 1741, 1742). For instance, the set of phase offsets can include 0°, 72°, 144°, 216°, and 288°.

A channel emulator can have more than two outputs, such as outputs B3, B4, B5, etc., in addition to outputs B1 and B2. Step 510 can be repeated for each pair of outputs. For instance, Step 510 can be repeated for pairs of outputs, such as B1 and B2, B1 and B3, B1 and B4, and B1 and B5.

In one implementation in reference to Step 520, a phase correction is calculated from the combined output power measurements at an input of the channel emulator corresponding to the set of phase offsets, and set to the second output phase setting while the first output phase setting is kept at the initial phase offset. Consequently, the phase relationship between the first signal path from input A3 to output B1 and the second signal path from input A3 to output B2 in channel emulator 130 is calibrated. The phase relationship between the first signal path from input A3 to output B1 and the second signal path from input A3 to output B2 in another channel emulator (not shown) can be calibrated simultaneously.

The description using equations for establishing a phase relationship is applicable to both the input phase relationship and the output phase relationship.

Figure 18:
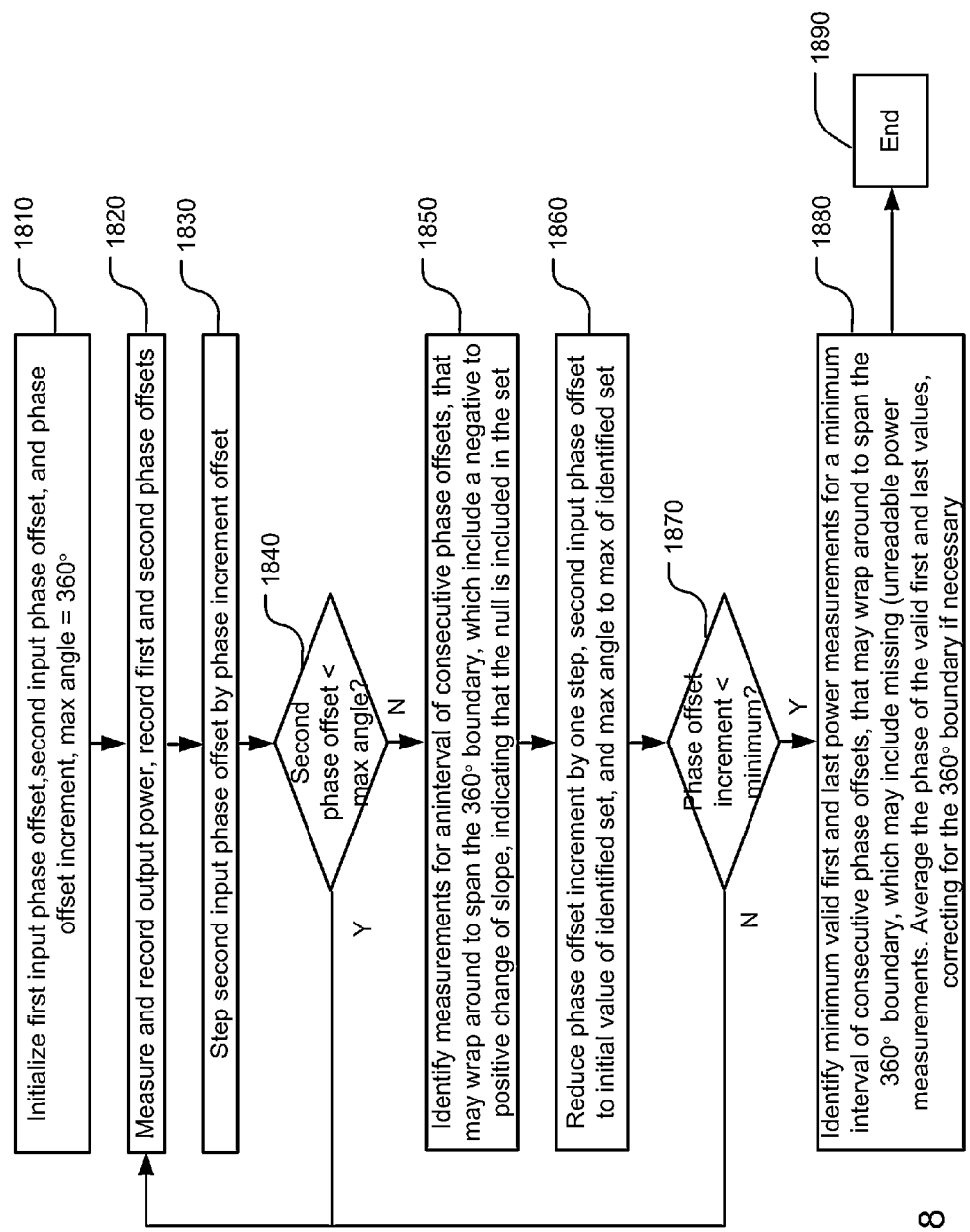
FIG. 18 is a flowchart illustrating an alternative implementation of the method in FIG. 5.

FIG. 18 is a flowchart illustrating an alternative implementation of the method in FIG. 5. The alternative implementation searches for an input phase offset between two signals, which are two copies of a signal, either a sinusoid or a wideband signal at which the output power measurement of the combined signal is at or near null. Two sinusoids will be used for discussion. For two sinusoids, a null in power occurs at 180° from phase alignment. Consequently, the phase alignment can be determined by adding 180° to the input phase offset at which the null power occurs.

In reference to the channel emulator 130 in FIG. 4 as an example, a signal, such as a wide-band signal or a CW signal, is applied to a first input A1 and a second input A2. Output power meter 138 is set to a measurement period adequate for sinusoids, such as 1 second. Paths are setup inside the channel emulator to connect input A1 to output B1 and input A2 to output B1. The path is setup to be a single static path, i.e. one path without any variation or fading, and without any delay. A first input phase offset at the first input and a second input phase offset at the second input are initialized to an initial value, e.g. 0°, and a phase offset increment is initialized to an initial increment, such as 60°. Also a set of phase offset increment values is defined, such as [60, 30, 15, 10, 5, 2, 1] (Step 1810). Output power is measured at an output (e.g. B1) that combines the first and second input signals at the first and second phase offsets. (Step 1820). If the output power is near null, the power may not be readable by a power meter and may be recorded as not-a-number. If the power is readable, the second input phase offset is stepped by the phase offset increment (Step 1830).

If after the stepping, the second input phase offset is less than a full period, such as 360° assuming the initial value is 0° (Step 1840, Y), output power is measured at the output corresponding to the new value of the second input phase offset (Step 1820). If after the stepping, the second input phase offset is at or greater than a full period (Step 1840, N), the power measurements are identified for an interval of consecutive phase offsets, that may wrap around to span the 360° boundary, which include a negative to positive change of slope, indicating that the null is included in the set. (Step 1850) This reduces the interval to evaluate. Now the phase offset increment is reduced by one step to a smaller increment. Further the second input phase offset is set to an initial value of the set identified in (Step 1850) and the maximum angle is set to the maximum of the identified set (Step 1860).

The phase offset incremented is tested, and if it is not less than the minimum, (Step 1870 N) returns to Step 1820. If the minimum has been satisfied (Step 1870 Y) then the process completes with the identification of the minimum valid first and last power measurements for a minimum interval of consecutive phase offsets, that may wrap around to span the 360 degree boundary, which may include missing (unreadable) power measurements. Average the phase of the valid first and last values are recorded after correcting for the 360° boundary if necessary (Step 1880). The process ends with Step 1890.

Because of the number of power measurements at the phase offset increments required in search, the operating time of this alternative implementation can be longer than the operating time of the implementation described in connection to FIG. 5A, that requires fewer number of power measurements at a small set of test angles, such as five test angles.

Cables between a network emulator (e.g. 110) and a channel emulator (e.g. 130) can present different delays to copies of a signal transmitted via the cables, in reference to FIG. 1. An additional method for calibrating a test platform to establish a phase relationship between copies of a signal includes testing multiple frequencies to determine delay differences, programming a channel emulator for the determined delay differences, and calculating a phase offset adjustment from the delay differences. Calculation of the phase offset adjustment from delay differences is described below using equations:

$$\phi = 2\pi * \frac{d}{\lambda}$$

$$d_{estimated} = \frac{\Delta\phi}{\Delta f} \frac{C}{2\pi}$$

$$\phi_{corrected} = 2\pi * \frac{(d - d_{estimated})}{\lambda}$$

where $\lambda$ is the wavelength of a sinusoidal wave, d is the relative delay difference of the signals on each path, $\phi$ is a phase offset corresponding to the delay d, $\Delta f$ is the difference between frequencies of two measurements, and $\Delta\phi$ is the difference between phase offsets, which are estimated for each of the two frequencies, and C is the speed of the waves. In one implementation, $d_{estimated}$, the delay value between two frequencies, is first calculated from $\Delta f$ and $\Delta\phi$, and then $\phi_{corrected}$, a phase offset adjustment between the two frequencies, is calculated from $d_{estimated}$.

Figure 19:
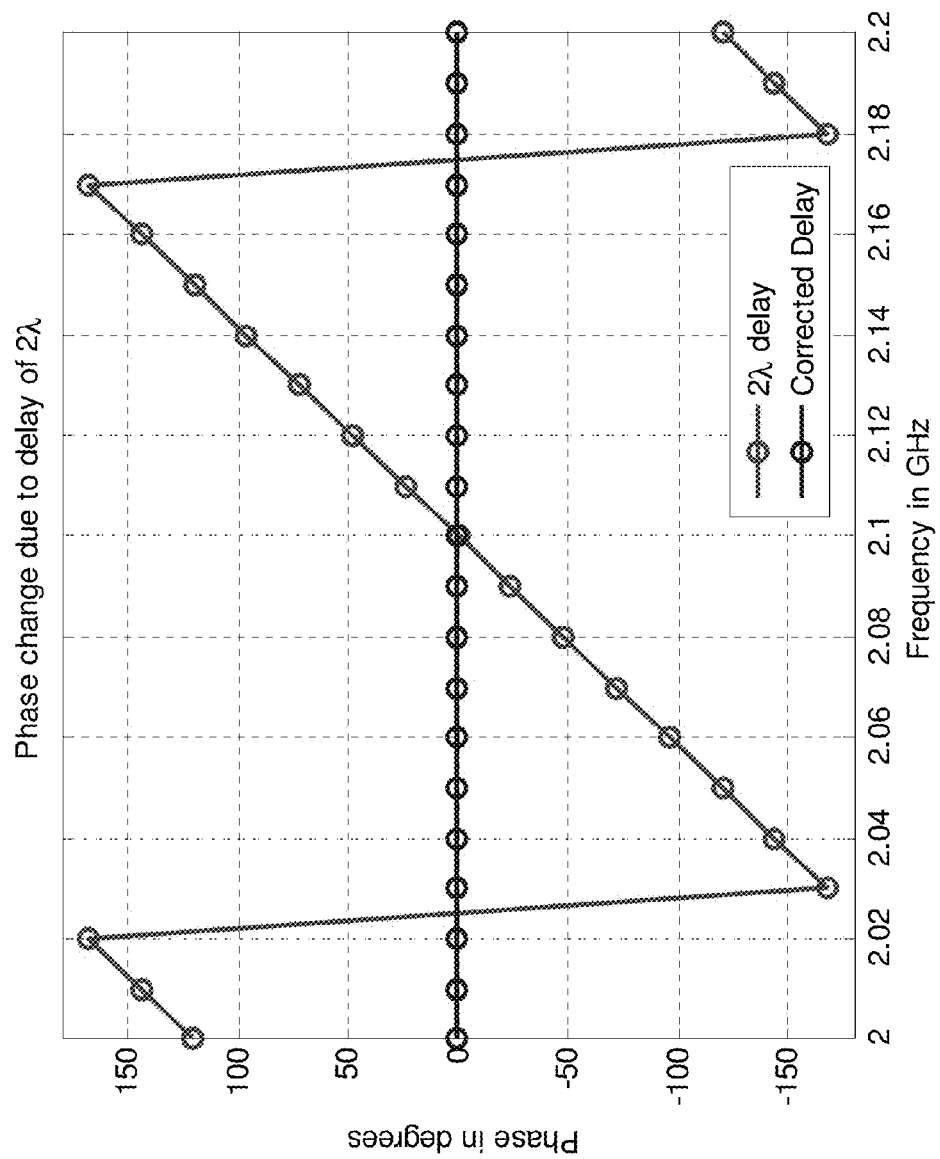
FIG. 19 is a plot of phase change due to delay at multiple frequencies.

FIG. 19 is a plot of phase offset change due to the difference in delay at multiple frequencies. FIG. 19 illustrates that without the corrected delay (e.g. $d_{estimated}$), phase offset can change linearly with frequency as a function of the delay difference. With a small delay difference only a few degrees may be observed across the band of interest, but with a larger delay difference the phase offset may change significantly and even wrap around from −180 to 180 degrees potentially more than one time.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method of calibrating a test platform to establish a phase relationship between copies of a signal at a measurement location within the test platform, comprising:
   manipulating phase relationships of the copies of the signal traversing signal paths and ending at the measurement location; and analyzing vector signal addition from the copies of the signal at the measurement location as the phase relationships are manipulated to find a phase offset adjustment that establishes a particular phase relationship between the signal paths.

2. The method of claim 1, comprising:
repeating said manipulating and said analyzing using a changed signal source and a changed signal path within the test platform.

3. The method of claim 1, comprising:
applying said manipulating and said analyzing to versions of a signal generated by a pair of signal sources and transmitted through the signal paths.

4. The method of claim 1, wherein said manipulating includes using one or more phase offsets for the signal paths.

5. The method of claim 4, comprising determining the phase offsets to reduce destructive signal addition from the copies of the signal.

6. The method of claim 1, comprising:
using a switching network with balanced signal paths to direct copies and versions of signals from a pair of signal sources within the test platform.

7. The method of claim 1, said manipulating comprising:
keeping a first copy of the signal at an initial phase offset;
setting a second copy of the signal to each phase offset in a set of phase offsets; and
measuring combined power resulting from vector signal addition of the first copy and the second copy of the signal at the measurement location as the second copy is set to the each phase offset.

8. The method of claim 7, said analyzing comprising:
deriving a first unknown phase offset $\theta_1$ from:

$$\phi_1 = \theta_1 - \text{arc-cosine}(P(\theta_1-\phi)-P_1-P_2)/(2\times\text{square-root}(P_1 \times P_2));$$

and
deriving a second unknown phase offset $\phi_2$ from:

$$\phi_2 = \theta_2 - \text{arc-cosine}(P(\theta_2-\phi)-P_1-P_2)/(2\times\text{square-root}(P_1 \times P_2)),$$

wherein $\theta_1$ and $\theta_2$ are first and second phase offsets in the set of phase offsets, $P(\theta_1-\phi)$ is a first measurement of the combined power when the second copy is set to the first phase offset $\theta_1$, $P(\theta_2-\phi)$ is a second measurement of the combined power when the second copy is set to the second phase offset $\theta_2$, $P_1$ is a first single-copy measurement of power at the measurement location from only the first copy of the signal, and $P_2$ is a second single-copy measurement of power at the measurement location from only the second copy of the signal.

9. The method of claim 8, wherein the first unknown phase offset includes two results, and the second unknown phase offset includes two other results, comprising:
identifying a first result from the two results of the first unknown phase offset, and a second result from the two other results of the second unknown phase offset, wherein the first result and the second result are closer to each other than to other results of the first unknown phase offset and the second unknown phase offset; and
averaging the first result and the second result to find the phase offset adjustment.

10. The method of claim 1, comprising:
measuring power at the measurement location from only a first copy of the signal to obtain a first single-copy measurement of power; and
measuring power at the measurement location from only a second copy of the signal to obtain a second single-copy measurement of power.

11. A test platform for calibrating a phase relationship between copies of a signal at a measurement location within the test platform, whether over the air or cabled, comprising:
signal paths transmitting the copies of the signal from a signal source to the measurement location;
phase settings in the signal paths for manipulating phase relationship of the copies of the signal; and
circuitry to analyze vector signal addition from the copies of the signal at the measurement location as the phase relationships are manipulated to find a phase offset adjustment that establishes a particular phase relationship between the signal paths.

12. The test platform of claim 11, comprising:
a changed signal path transmitting different copies of the signal from a changed signal source within the test platform.

13. The test platform of claim 11, comprising:
a pair of signal sources generating versions of a signal transmitted through the signal paths.

14. The test platform of claim 11, wherein:
the phase settings are configured with one or more phase offsets for the signal paths.

15. The test platform of claim 14, wherein:
the phase offsets are determined to reduce destructive signal addition from the signal copies.

16. The test platform of claim 11, comprising:
a switching network with balanced signal paths to direct copies and versions of signals from a pair of signal sources through the test platform.

\* \* \* \* \*